US011448843B2

(12) United States Patent
Geling et al.

(10) Patent No.: US 11,448,843 B2
(45) Date of Patent: Sep. 20, 2022

(54) ROTATABLE PATCH CABLE HOLDER

(71) Applicants: CommScope Connectivity Belgium BVBA, Kessel-Lo (BE); ADC Czech Republic, S.R.O., Brno (CZ)

(72) Inventors: Bernardus Johannes Nicolas Geling, Genk (BE); Johan Geens, Bunsbeek (BE); Tomas Fucsek, Topolniky (SK)

(73) Assignees: CommScope Connectivity Belgium BVBA, Kessel-Lo (BE); ADC Czech Republic, S.R.O., Brno (CZ)

( * ) Notice: Subject to any disclaimer, the term of this patent is extended or adjusted under 35 U.S.C. 154(b) by 0 days.

(21) Appl. No.: 16/853,243

(22) Filed: Apr. 20, 2020

(65) Prior Publication Data
US 2021/0003798 A1 Jan. 7, 2021

Related U.S. Application Data

(63) Continuation of application No. 16/111,801, filed on Aug. 24, 2018, now Pat. No. 10,627,591, which is a continuation of application No. 15/512,031, filed as application No. PCT/EP2015/071222 on Sep. 16, 2015, now Pat. No. 10,082,634.

(60) Provisional application No. 62/064,316, filed on Oct. 15, 2014.

(51) Int. Cl.
*G02B 6/44* (2006.01)
(52) U.S. Cl.
CPC ......... *G02B 6/4452* (2013.01); *G02B 6/4455* (2013.01); *G02B 6/44* (2013.01)

(58) Field of Classification Search
None
See application file for complete search history.

(56) References Cited

U.S. PATENT DOCUMENTS 3,991,960 A  11/1976 Tanaka
5,601,260 A   2/1997 Shinohara et al.
5,704,573 A   1/1998 de Beers et al.
(Continued)

FOREIGN PATENT DOCUMENTS

WO  2011/100613 A1  8/2011

OTHER PUBLICATIONS

International Search Report and Written Opinion of the International Authority for International Patent Application No. PCT/EP2015/071222 dated Dec. 22, 2015, 10 pgs.

*Primary Examiner* — Rhonda S Peace
(74) *Attorney, Agent, or Firm* — Merchant & Gould P.C.

(57) ABSTRACT

A multi-positionable tray assembly (20) for mounting within a chassis (10) of a telecommunications panel (100) is disclosed. The multi-positionable tray assembly (20) may include a support arm (24) that pivotally supports a tray (22) and that allows the tray assembly (20) to be installed and removed from the chassis (10). The tray (22) and the support arm (24) cooperatively define a cable routing pathway (208) extending through a pivot axis (A1) defined by the tray and the support arm. To minimize the required tray (22) depth and optimize cable routing, the tray (20) can include a cable management structure (102) with a patch panel (104) having a plurality of adapters (108) arranged along a transverse axis (A2) that is non-parallel or oblique to a front plane (A4) of the tray. To improve connector access, rotatable patch cable holders (400) can be provided on the patch panel (104).

17 Claims, 26 Drawing Sheets

(56) References Cited

U.S. PATENT DOCUMENTS

| | | | |
|---|---|---|---|
| D411,735 S * | 6/1999 | Bernard | D8/356 |
| 5,921,402 A * | 7/1999 | Magenheimer | H04Q 1/06 |
| | | | 211/26 |
| 5,946,440 A | 8/1999 | Puetz | |
| 5,996,944 A * | 12/1999 | Daoud | F16L 3/00 |
| | | | 174/135 |
| D439,504 S * | 3/2001 | Caveney | D8/356 |
| 6,263,141 B1 | 7/2001 | Smith | |
| 6,327,139 B1 | 12/2001 | Champion et al. | |
| 6,370,246 B1 * | 4/2002 | Daoud | F16L 3/23 |
| | | | 248/68.1 |
| 6,380,484 B1 | 4/2002 | Theis et al. | |
| 6,427,952 B2 * | 8/2002 | Caveney | F16L 3/23 |
| | | | 248/68.1 |
| 6,504,100 B2 * | 1/2003 | Lawrence | H02B 1/202 |
| | | | 174/100 |
| 6,510,274 B1 | 1/2003 | Wu et al. | |
| 6,658,193 B1 | 12/2003 | Ati et al. | |
| 6,669,149 B2 * | 12/2003 | Akizuki | H02G 3/26 |
| | | | 248/222.12 |
| 6,805,248 B2 | 10/2004 | Champion et al. | |
| 6,946,605 B2 | 9/2005 | Levesque et al. | |
| 7,023,708 B2 | 4/2006 | Nguyen et al. | |
| 7,071,418 B2 | 7/2006 | Brockman et al. | |
| 7,527,226 B2 | 5/2009 | Kusuda et al. | |
| 7,734,139 B2 * | 6/2010 | Rector, III | G02B 6/4471 |
| | | | 385/136 |
| 7,893,356 B2 | 2/2011 | Garza et al. | |
| 8,056,869 B2 | 11/2011 | Newhouse et al. | |
| 8,270,798 B2 * | 9/2012 | Dagley | G02B 6/4452 |
| | | | 385/135 |
| 8,485,479 B2 * | 7/2013 | Chiu | H02G 3/32 |
| | | | 248/68.1 |
| 8,731,364 B2 * | 5/2014 | Murano | G02B 6/4471 |
| | | | 385/136 |
| 8,879,881 B2 | 11/2014 | Cote et al. | |
| 8,882,051 B2 | 11/2014 | Bleus et al. | |
| 8,934,252 B2 | 1/2015 | Anderson et al. | |
| 9,075,216 B2 * | 7/2015 | Cote | G02B 6/4452 |
| 9,081,164 B2 | 7/2015 | Badar et al. | |
| 9,500,829 B2 * | 11/2016 | Rudenick | F16L 3/18 |
| 9,690,065 B2 | 6/2017 | Wiltjer et al. | |
| 9,823,432 B2 | 11/2017 | Alexi et al. | |
| 10,082,634 B2 | 9/2018 | Geling et al. | |
| 2003/0086675 A1 | 5/2003 | Wu et al. | |
| 2003/0190036 A1 | 10/2003 | Mandoza | |
| 2007/0054528 A1 | 3/2007 | Caveney et al. | |
| 2008/0175552 A1 | 7/2008 | Smrha et al. | |
| 2008/0296426 A1 | 12/2008 | Cairns et al. | |
| 2009/0148117 A1 | 6/2009 | Laurisch | |
| 2010/0220968 A1 * | 9/2010 | Dagley | G02B 6/4452 |
| | | | 385/135 |
| 2010/0272410 A1 | 10/2010 | Krampotich et al. | |
| 2011/0211801 A1 * | 9/2011 | McGranahan | G02B 6/4471 |
| | | | 385/136 |
| 2011/0228473 A1 | 9/2011 | Anderson et al. | |
| 2015/0316738 A1 | 11/2015 | McPhil Giraud et al. | |
| 2016/0047999 A1 | 2/2016 | Alexi et al. | |

* cited by examiner

ROTATABLE PATCH CABLE HOLDER

CROSS-REFERENCE TO RELATED APPLICATIONS

This application is a Continuation of U.S. patent application Ser. No. 16/111,801, filed on Aug. 24, 2018, now U.S. Pat. No. 10,627,591, which is a Continuation of U.S. patent application Ser. No. 15/512,031, filed on Mar. 16, 2017, now U.S. Pat. No. 10,082,634, which is a National Stage Application of PCT/EP2015/071222, filed on Sep. 16, 2015, which claims benefit of U.S. Patent Application Ser. No. 62/064,316, filed on Oct. 15, 2014, the disclosures of which are incorporated herein by reference in their entireties. To the extent appropriate, a claim of priority is made to each of the above disclosed applications.

FIELD OF THE INVENTION

The present invention relates to telecommunications panels and cable bend control guides, patch cable supports, and hinges adapted to be used in various telecommunications panels.

BACKGROUND

Numerous telecommunications panels exist today and are used in various equipment applications. Conventional telecommunications panels include hinges that are designed to allow a tray to be rotated out of the telecommunications panel. By rotating the tray out of the telecommunications panel, access is provided to rear portions of a termination field. Such trays may include cable management structures that aid in organizing and managing telecommunications cables routed to and away from the telecommunications panel.

SUMMARY

Aspects of the disclosure are directed to a multi-positionable tray assembly for mounting within a chassis of a telecommunications panel. In one aspect, the multi-positionable tray assembly includes a tray and a support arm. The tray is configured to support at least one cable management structure while the support arm is connected to and supports the tray at a pivot joint. This structure allows the tray to be rotatable about the pivot joint at a pivot axis between a folded position and an access position. In one aspect, the support arm is configured for removable attachment to the chassis such that the multi-positionable tray assembly can be placed in a removed position away from the chassis and an installed position within the chassis.

In one aspect, the tray and the support arm cooperatively define a cable routing pathway that extends through the pivot axis of the pivot joint defined by the tray and the support arm. In contrast to pivoting trays relying upon a structural element extending along the pivot axis, the disclosed configuration has an open configuration that allows for cabling to be routed through the pivot axis without having to be routed around a structural element.

In yet another aspect, the cable management structure in the tray includes a patch panel having a plurality of adapters arranged along a transverse axis, wherein each of the adapters has a longitudinal connection axis. In one configuration, some of the adapters are positioned with their longitudinal connection axes disposed at an oblique angle relative to the transverse axis. In one configuration, the patch panel transverse axis is non-parallel or oblique to the front face and rear side of the tray. By placing the adapters at an angle relative to the tray and the transverse axis, less depth is required of the tray to accommodate cabled fiber optic connecters that are connected on either or both sides of the adapters. By placing the patch panel transverse axis at an angle with respect to the front face of the tray, the areas within the tray that have the largest accumulated bundles of patch cables are increased in size to better accommodate the cords.

In yet another aspect, the patch panel is provided with one or more rotatable patch cable holders for improving access to adjacent connectors and adapters. The patch cable holder can be provided with a base portion, a cable support portion configured to support a plurality of patch cables, and a hinge portion. The hinge portion can rotatably connect the base portion to the cable support portion such that the cable support portion can rotate generally about an axis with respect to the base portion. In one example, the hinge portion is formed as a living hinge. In one example, the base portion, the cable portion, and the hinge portion are integrally formed as a single component.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Whenever possible, the same reference numbers will be used throughout the drawings to refer to the same or similar parts.

Figure 1:
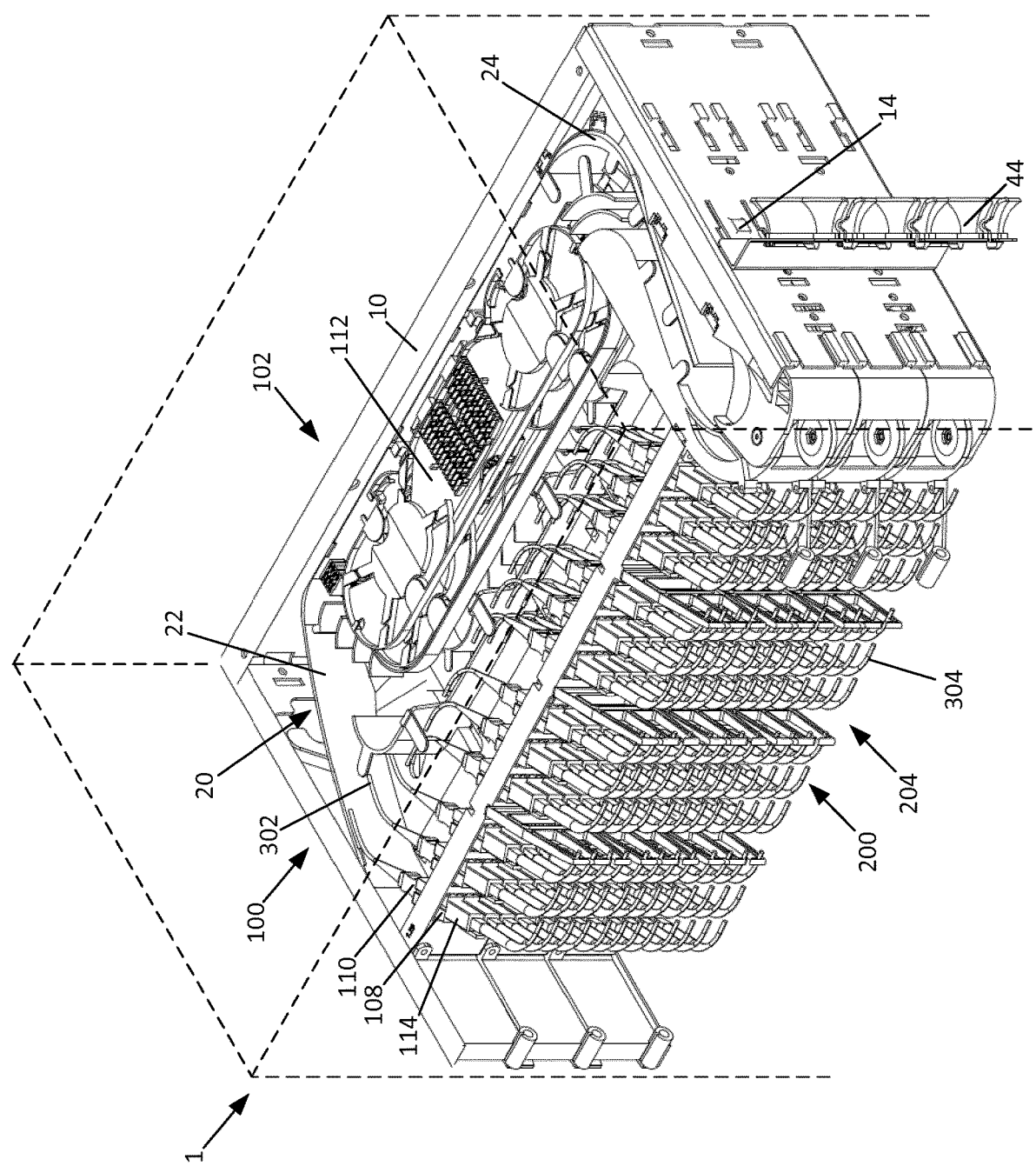
FIG. 1 is a perspective view of an example telecommunications panel including a plurality of multi-positionable tray assembly in accordance with principles of the present disclosure.
Figure 2:
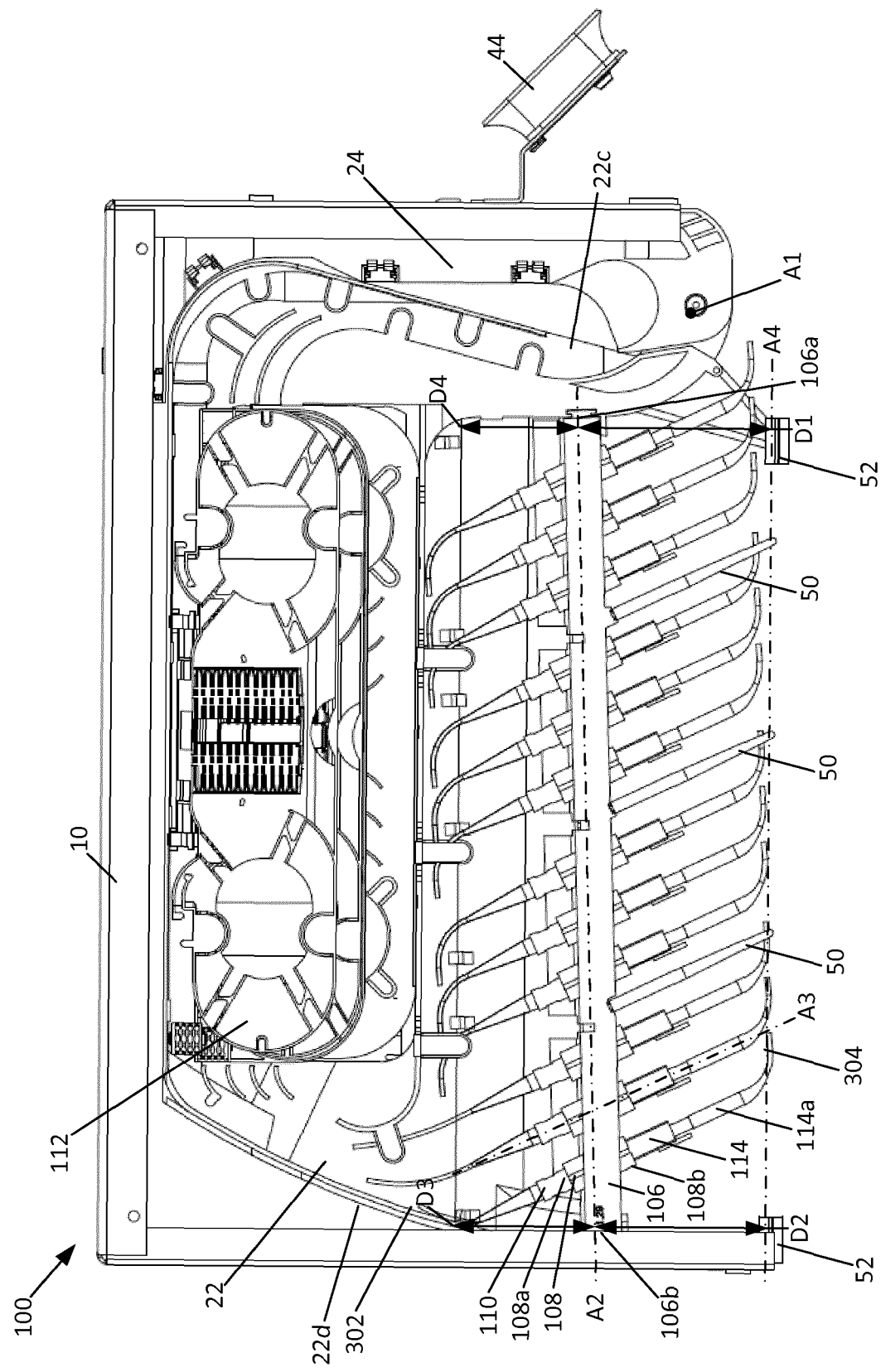
FIG. 2 is a top view of the telecommunications panel of FIG. 1.
Figure 3:
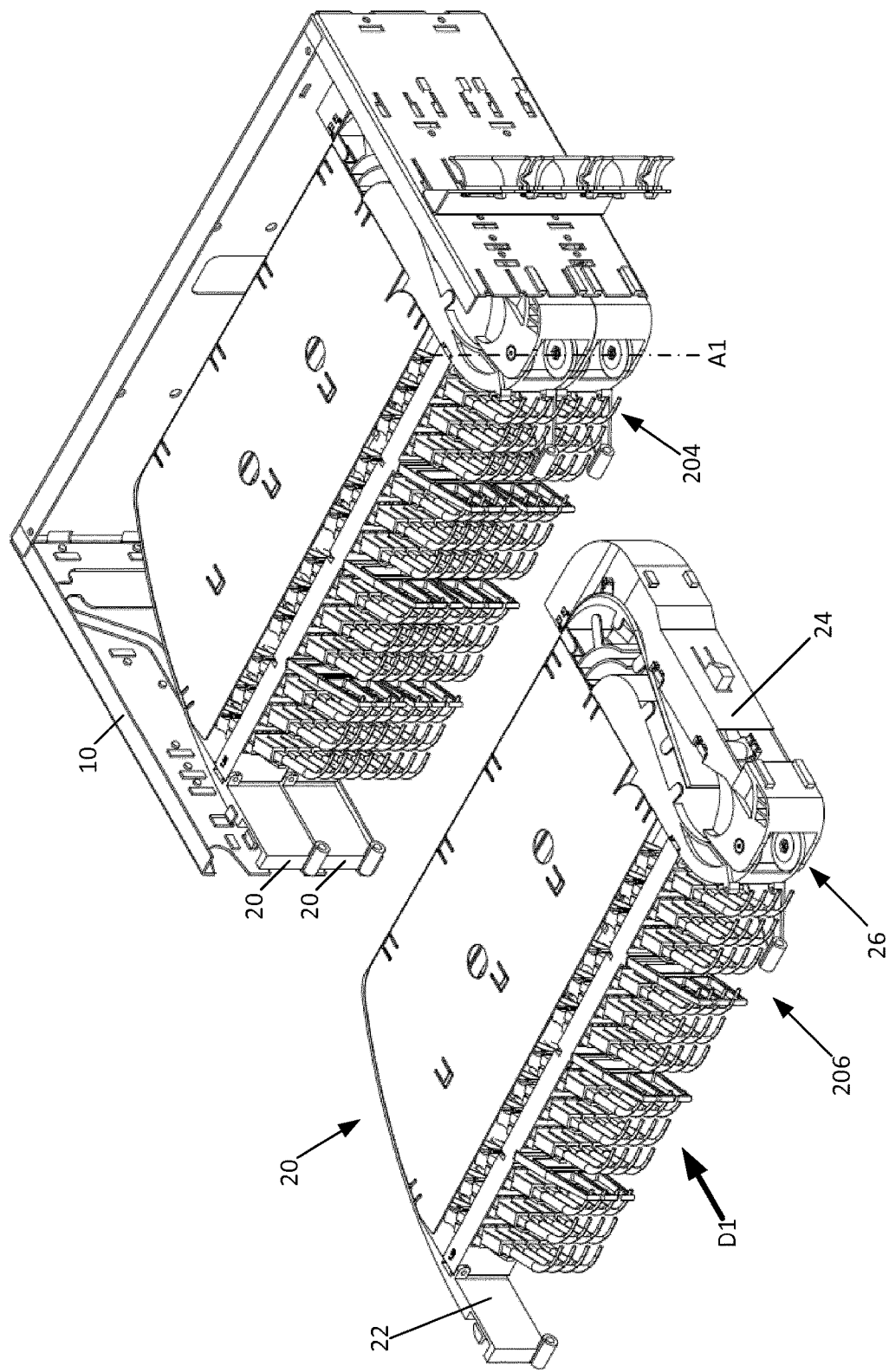
FIG. 3 is a perspective view of the telecommunications panel of FIG. 1, with one of the multi-positionable tray assemblies in a removed position.

Referring now to FIGS. 1 and 2, a telecommunications panel 100 (e.g., an enclosure, an optical distribution frame, etc.) is illustrated according to the principles of the present disclosure. As further illustrated at FIG. 1, the telecommunications panel 100 may be included in a cabinet 200. The telecommunications panel 100 and/or the cabinet 200 may be used for various purposes in telecommunications systems. For example, housing a cable management structure 102 including, for example, stacked splice trays 112 and a patch panel 104. In one aspect, patch cables 302, 304 (i.e., patch cables, connectorized fiber optic cables, etc.) may enter the telecommunications panel 100 and/or the cabinet 200 and be interconnected at a patch panel 104. The patch panel 104 may include a plurality of fiber to optic adapters 108. Fiber optic connectors 110, 114 that terminate ends of the patch cables 302, 304 may connect with the fiber optic adapters 108 of the patch panel 104. The interconnections at the patch panel 104 may be rearranged from time-to-time, as desired, for changing configurations of the telecommunications system. The telecommunications panel 100 may further hold splitters, filters, and various other telecommunications components.

The telecommunications panel 100 may include a chassis 10 to which a plurality of stacked multi-positionable tray assemblies 20 may be removably attached. In one aspect, the multi-positionable tray assembly 20 includes a tray 22 (e.g., a sub-rack) and a support arm 24 that are pivotally connected to each other via a pivot joint 26 that allows the tray assembly 20 to be moved between a folded position 200 and an access position 202. The pivot joint 26 is formed by the interface between an upper joint arm 28 of the support arm 24 and an upper joint extension 32 of the tray 22 and by the interface between a lower joint arm 30 of the support arm 24 and a lower joint extension 34 of the tray 22. The interfaces can be secured together by a variety of structures, for example, a snap-fit type connection via protrusions and corresponding recesses or by a connection utilizing fasteners. As depicted, the pivot joint 26 represents the connection between the tray 22 and the support arm 24 to the chassis 10 and defines a vertical hinge with an axis A1 for the multi-positionable tray assembly 20.

Figure 4:
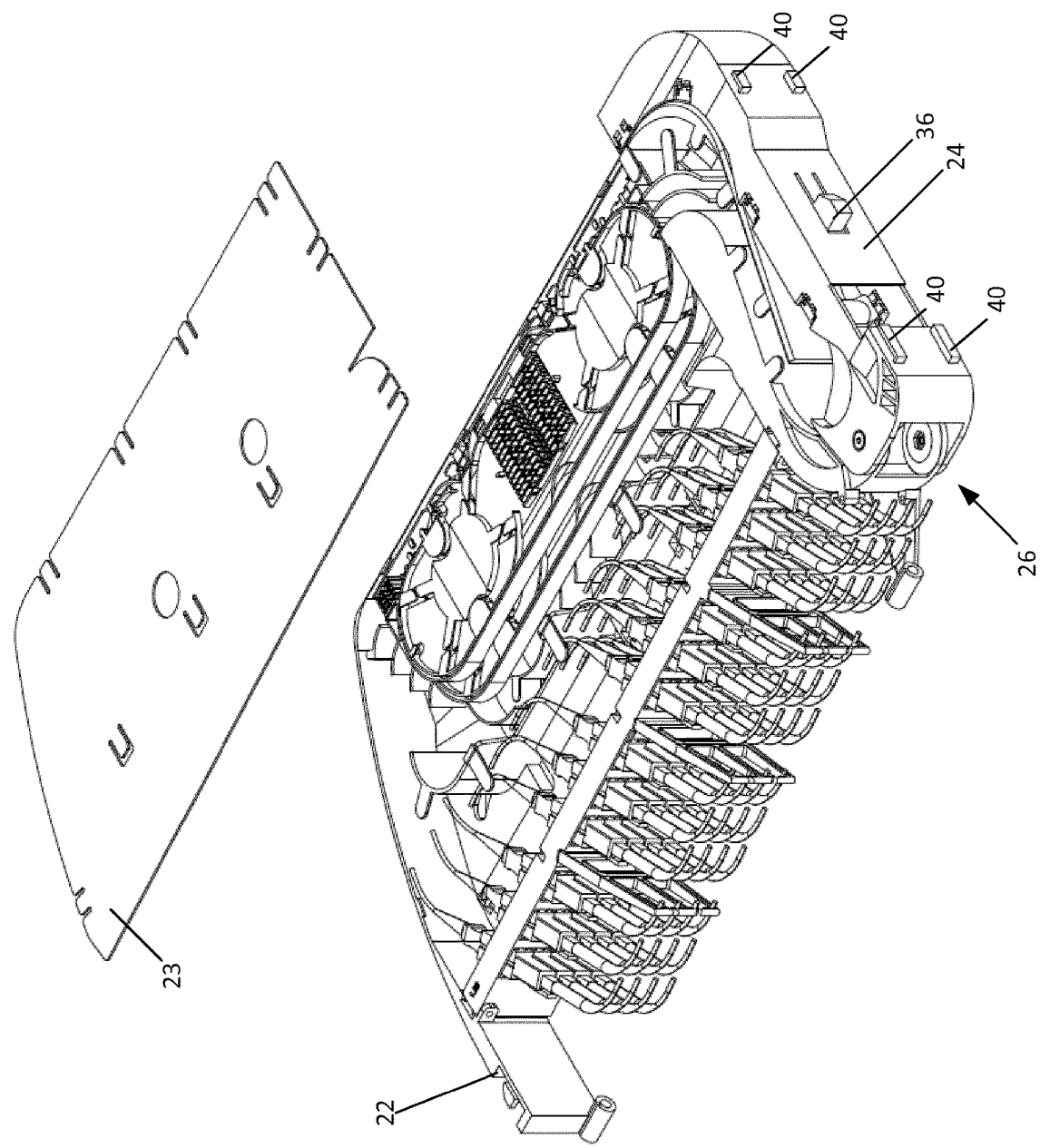
FIG. 4 is a perspective view of the chassis of the telecommunications panel of FIG. 1.
Figure 5:
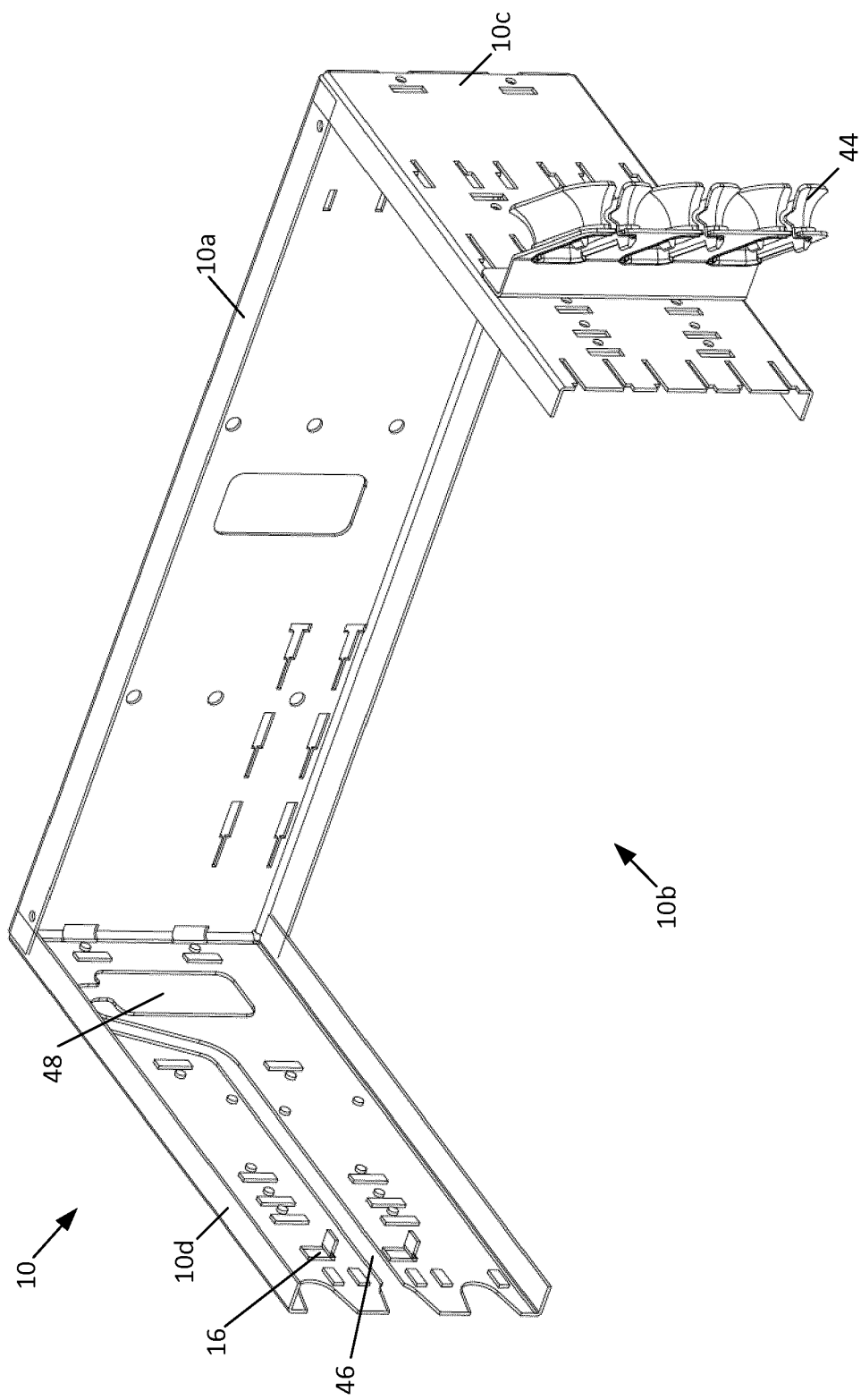
FIG. 5 is a perspective view of one of the multi-positionable tray assemblies of FIG. 1.
Figure 6:
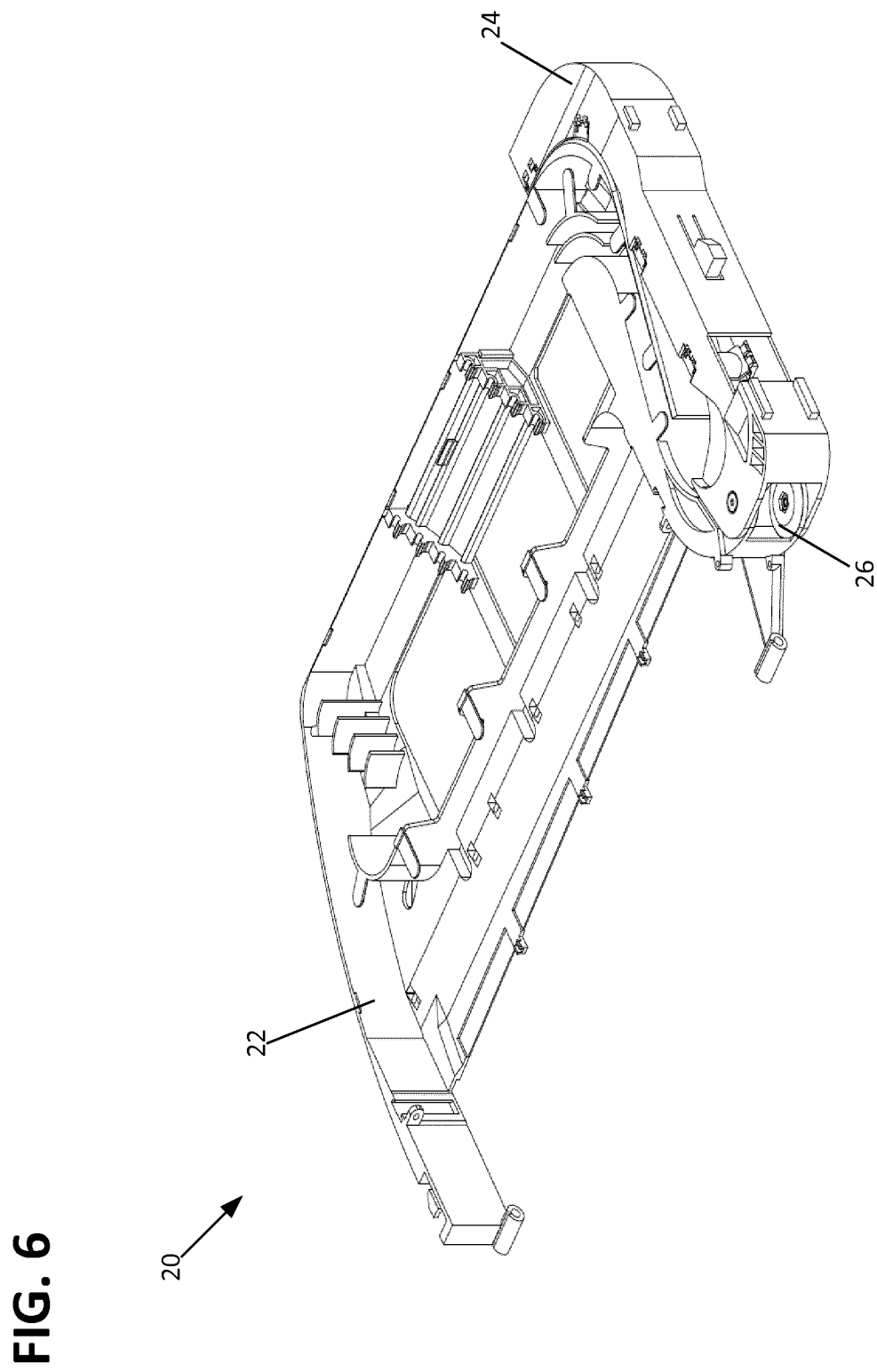
FIG. 6 is a perspective view of the multi-positionable trays of FIG. 6 with the various cable management structures removed from the tray.
Figure 7:
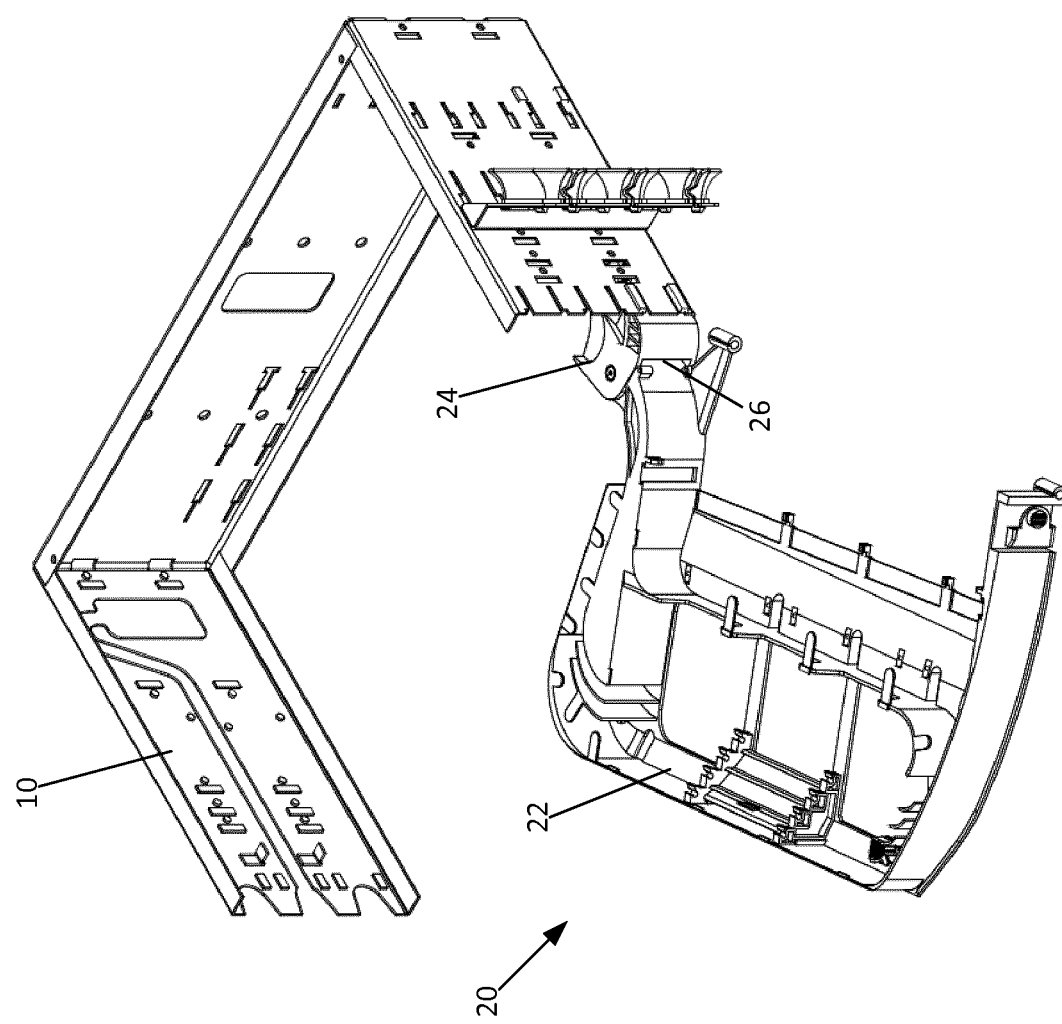
FIG. 7 is a perspective view of the multi-positionable tray assembly of FIG. 6 mounted to the chassis in an installed position and rotated into an access position.

As most easily seen at FIG. 4, the chassis 10 includes a rear side 10a extending between a first side 10c and a second side 10d. The chassis 10 also includes an open front side 10b for slidably receiving the tray assembly 20. The chassis may include a number of features to facilitate the mounting of the tray assembly 20 to the chassis 10 from a removed position 206 to an installed position 204. For example, the chassis 10 may be provided with a plurality of attachment slots 12 at the first and second sides 10c, 10d that are configured to engage with corresponding attachment guide members 40 located on the support arm 24. In the embodiment shown, the attachment slots 12 and the guide members 40 extend in a direction D1 that is parallel to the first and second sides 10c, 10d of the chassis 10. This configuration allows the guide members 40 to engage with the attachment slots 12 when the tray assembly 20 is inserted into the chassis 10 into an installed position 204. In one example, the guide members 40 have a T-shape cross-section to more securely engage the attachment slots 12 by preventing rotation of the support arm 24 with respect to the side 10c or 10d of the chassis 10 to which the support arm 24 is attached.

The chassis 10 can also be provided with features to secure the tray assembly 20 within the chassis 10 so that the tray assembly 20 is retained in the installed position 204. For example, the chassis 10 can be provided with a first latch recess 14 configured to receive a first latch member 36 of the tray assembly 20. In the embodiment shown, the support arm 24 is provided with a depressible first latch member 36 that initially deflects as the tray assembly 20 is being pushed into the installed position 204 and then snaps into the latch recess 14 once the tray assembly 20 is fully installed to form a snap-fit type of connection. The tray assembly 20 can be released from the chassis 10 by depressing the latch member 36 and pulling the tray assembly out of the chassis 10.

The chassis 10 can also be provided with features to secure the tray 22 of the tray assembly 20 to the chassis 10 so that the tray assembly 20 is retained in the folded position 200. For example, the chassis 10 can be provided with a second latch recess 14 configured to receive a second latch member 38 of the tray assembly 20. In the embodiment shown, the support arm 24 is provided with a second depressible latch member 38 that initially deflects as the tray assembly 20 is being rotated into the folded position 200 and then snaps into the latch recess 38 once the tray assembly 20 is fully rotated to form a snap-fit type of connection. The tray 22 can be released from the chassis 10 by depressing the latch member 38 and rotating the tray 22 away from the chassis 10 towards the access position 202.

The chassis 10 can also be configured to support other components of the telecommunications panel 100, as desired. For example, the chassis 10 can be configured to support cable management features 44 and 54. In the embodiment shown, cable management features 54 and 44 guide patch cables 304 extending from the tray assembly 20. The chassis 10 may also be provided with one or more features for allowing cable to enter the chassis 10, for example cable routing slot 46 and cable routing aperture 48.

In addition to the previously described aspects of the support arm 24, the support arm 24 further includes a first end 24a and a second end 24b having an exterior side 24d, a top wall 24e, and a bottom wall 24f. In the embodiment presented, the walls 24e, 24f and the side 24d together form a channel-like structure having an open interior side 24c within which a portion of a cable pathway 208 is formed. Adjacent the first end 24a are the upper and lower joint arms 28, 30 that form a part of the pivot joint 26. In one aspect, the support arm 24 is provided with a plurality of cable guides 42 to ensure that cables 300 routed within the support arm 24 are adequately retained.

In addition to the previously described aspects of the tray 22, the tray 22 further includes a rear side 22a and a front side 22b that extend between opposite first and seconds sides 22c, 22d. The tray 22 may also be provided with a cover 23 for protecting the components and fiber supported within the tray 22. In one aspect, the tray 22 includes a pair of hinges 52 for rotatably supporting an access door or cover. The location of the door and hinges 52 can define a front plane A4 of the tray 22 which is shown as being parallel to the rear side 22a and orthogonal to the first and second sides 22c, 22d.

The tray 22 further defines the cable routing pathway 208 via the walls forming the first side 22c and the rear side 22a of the tray 22, along with a bottom portion 22h of the tray 22. An interior wall structure 22e also functions to define the cable routing pathway 208, as do radius guides 22f which prevent the cables 300 from kinking or bending too severely. The cables 300 can be further retained within the cable routing pathway 208 via a plurality of cable guides 22g located at the top of the tray 22.

Figure 17:
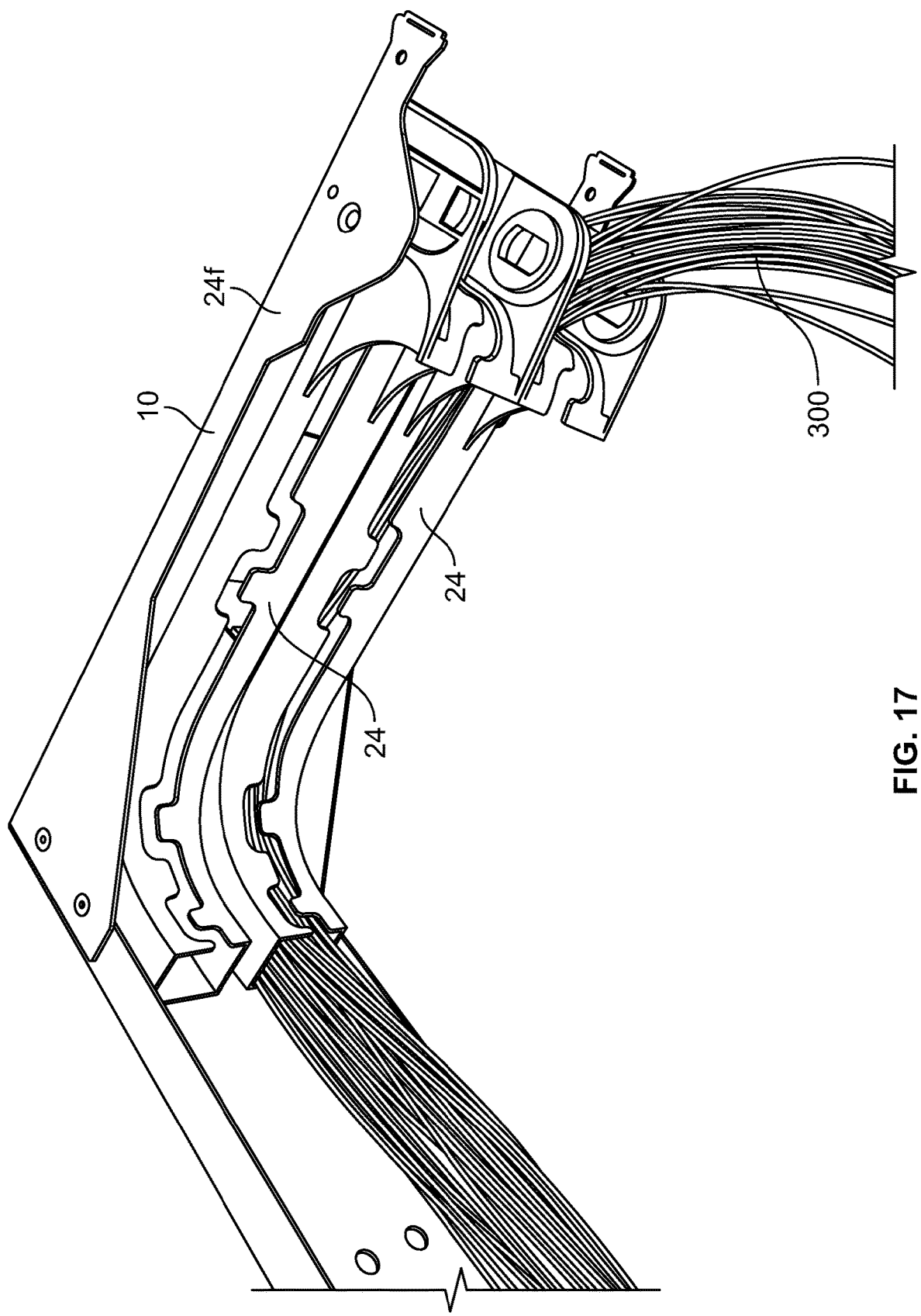
FIG. 17 is a perspective photographic view of a support arm of FIG. 12 with cables routed within a cable routing path defined by the support arm.
Figure 18:
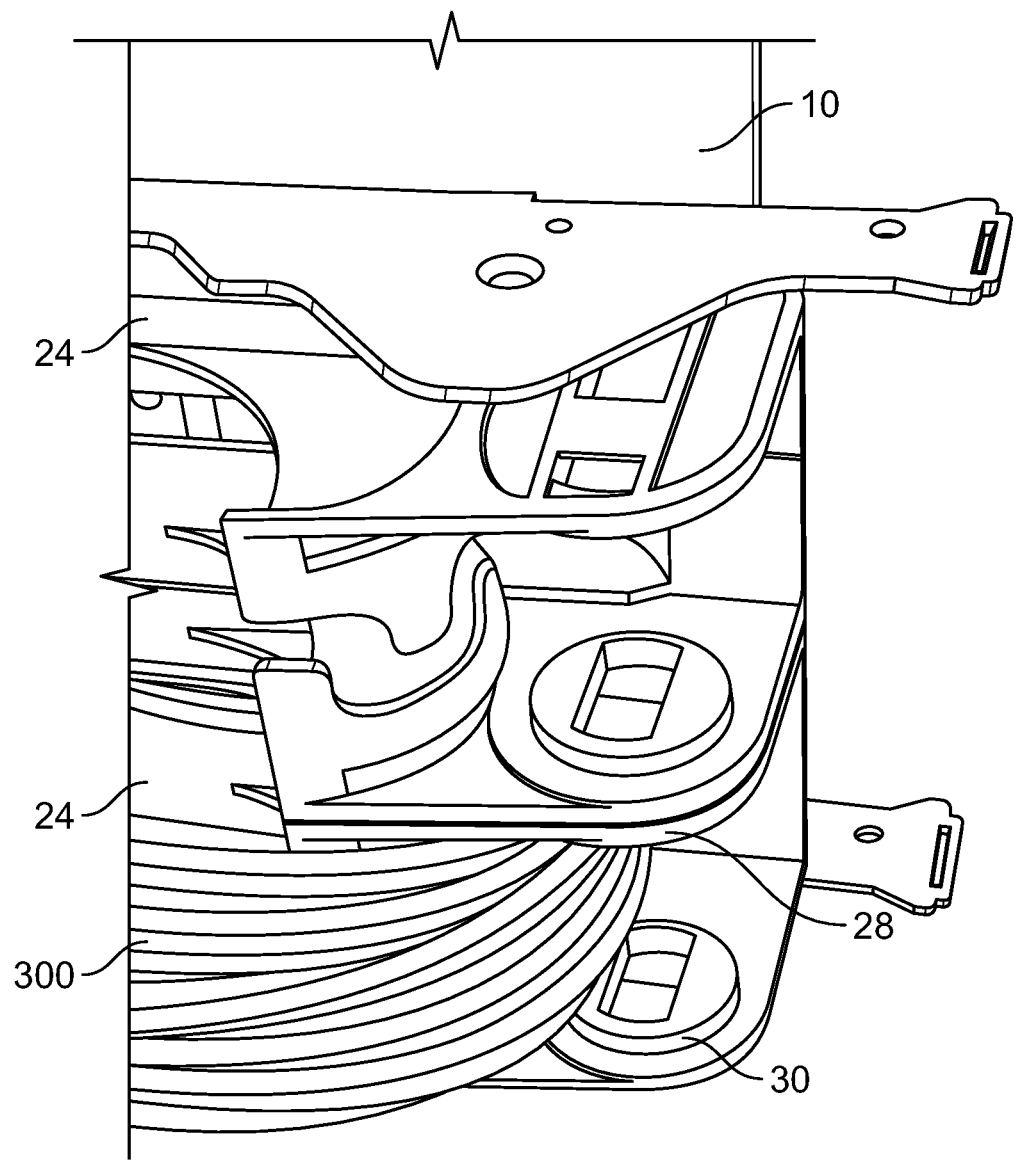
FIG. 18 is a perspective photographic view of a support arm of FIG. 12 with cables of FIG. 17 wrapped around the first end of the support arm about the pivot joint.
Figure 19:
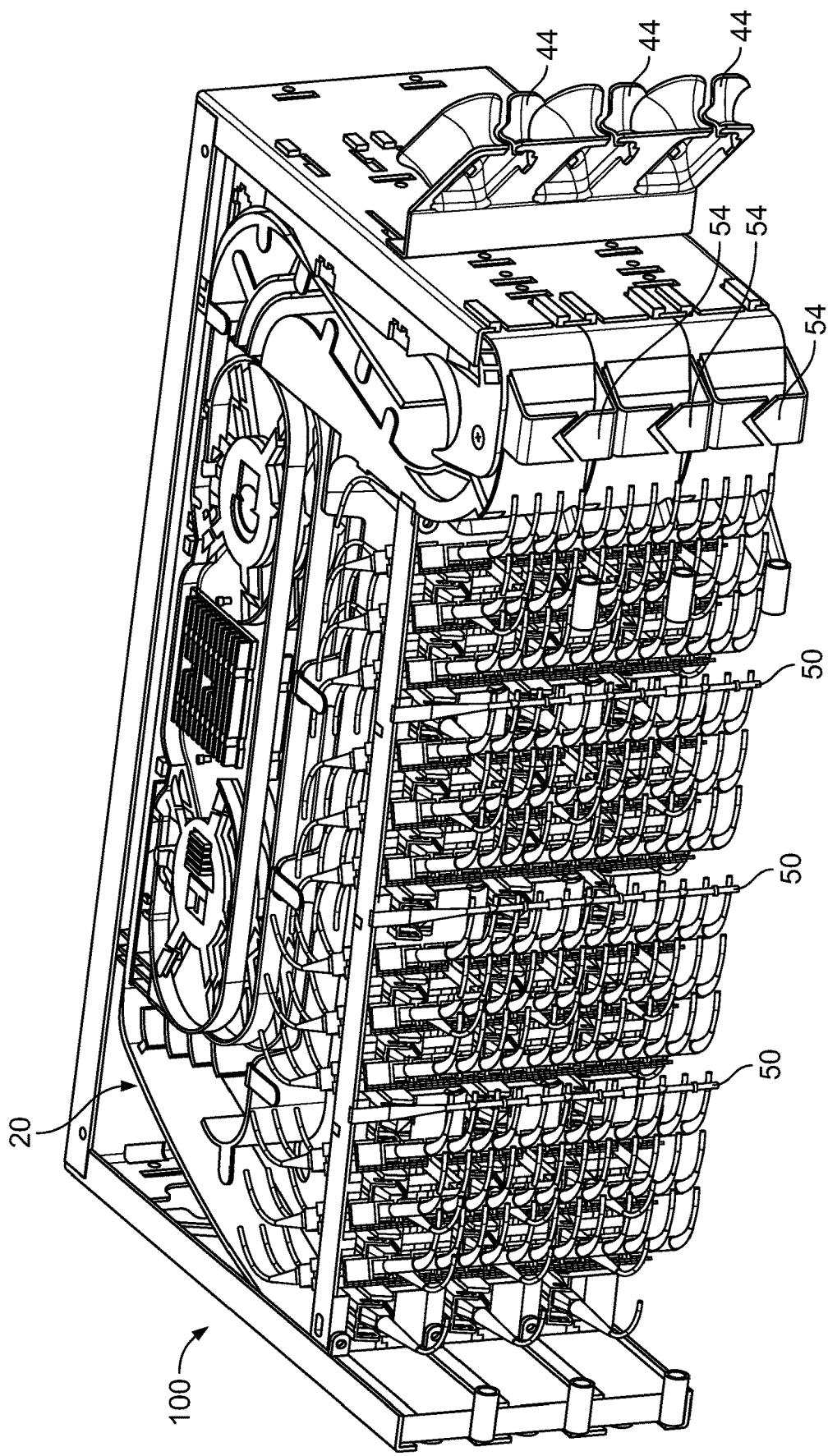
FIG. 19 is a perspective view of the telecommunications panel of FIG. 1, with additional cable mounting features mounted thereon.

As discussed previously, the cable routing pathway 208 passes between the space defined between the upper and lower joint extensions 32, 34 of the tray 22. Because the upper joint extension 32 engages with the upper joint arm 28 and the lower joint extension 34 engages with the lower joint arm 30, the pivot joint 26 is formed without the need for any structure between the upper and lower joint extensions 32, 34. Accordingly, this space can be utilized to define the cable routing pathway 208 as it extends from the support arm 24 and the tray 22. The upper and lower joint extensions 32, 34 also serve to constrain the cables 300 as the cables traverse between the support arm 24 and the tray 22. Accordingly, the cables 300 within the cable routing pathway 208 enter the tray 22 through the pivot joint 26 in an orientation that is perpendicular to the rotation axis A1. FIGS. 17 and 18 show an example of a number of cables 300 passing through the pivot joint 26. A key benefit to allowing the cables 300 to be routed through the pivot joint 26 rotational axis A1 is that the routing length of the cables 300 can remain relatively unchanged as the tray 22 is rotated between the folded and access positions 200, 202. Thus, the rotation of the tray 22 does not cause undue tension on the cables 300 as the tray 22 is being rotated about the pivot axis A1.

Figure 8:
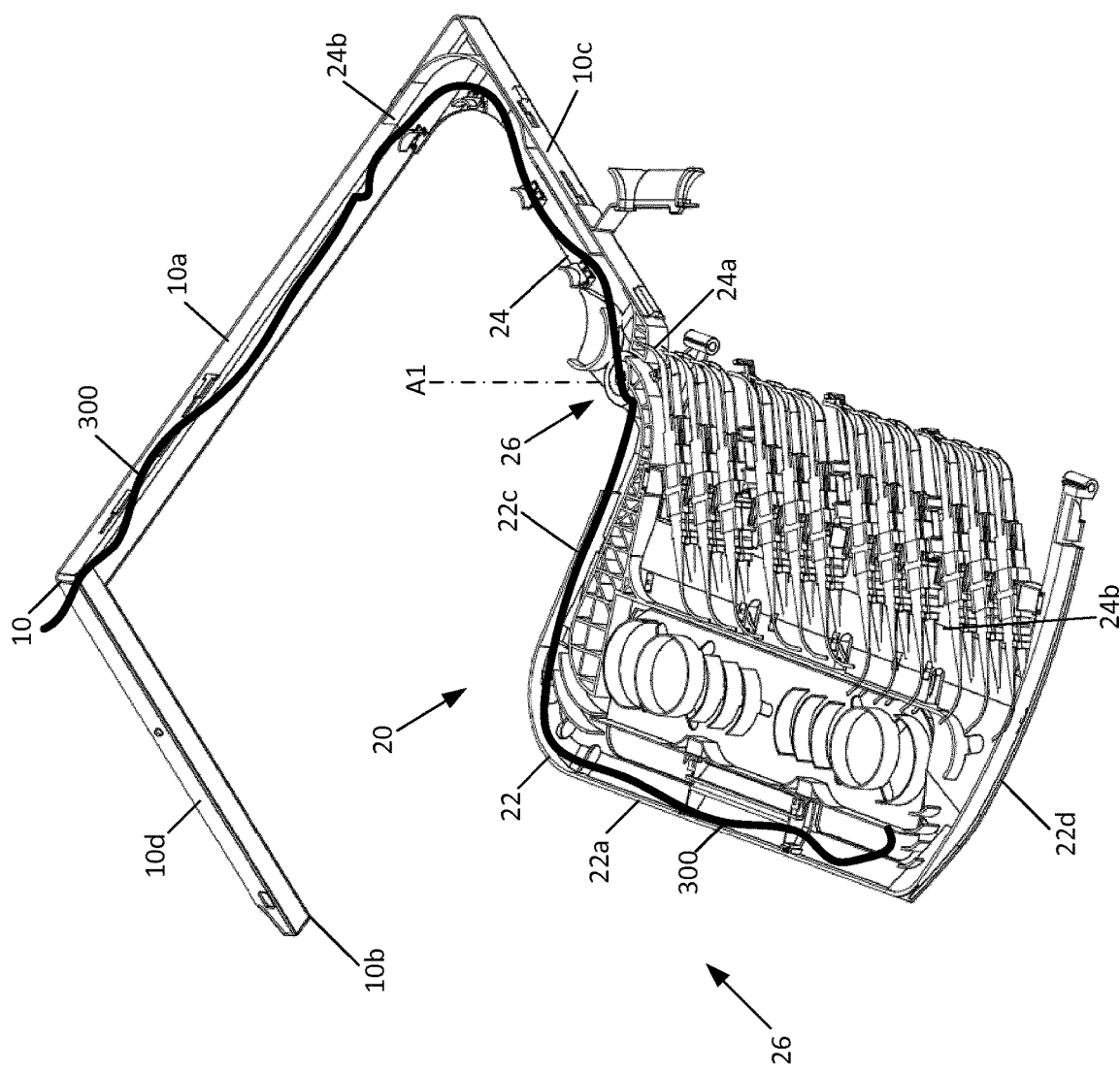
FIG. 8 is a cross-sectional perspective view of one of the multi-positionable tray assemblies of FIG. 1 shown in an installed position and rotated into an access position.
Figure 9:
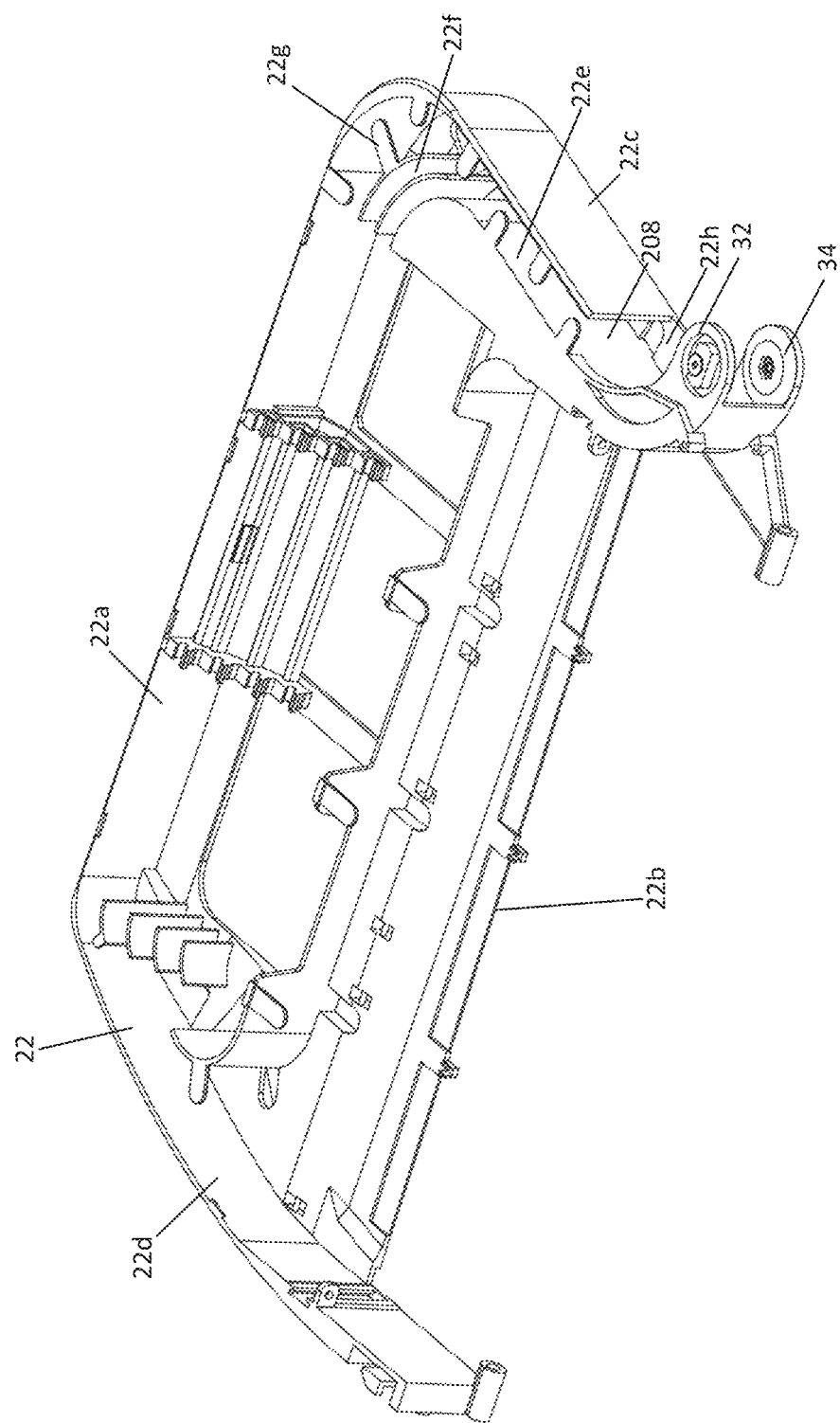
FIG. 9 is a perspective view of a tray of one of the multi-positionable tray assemblies of FIG. 1.
Figure 10:
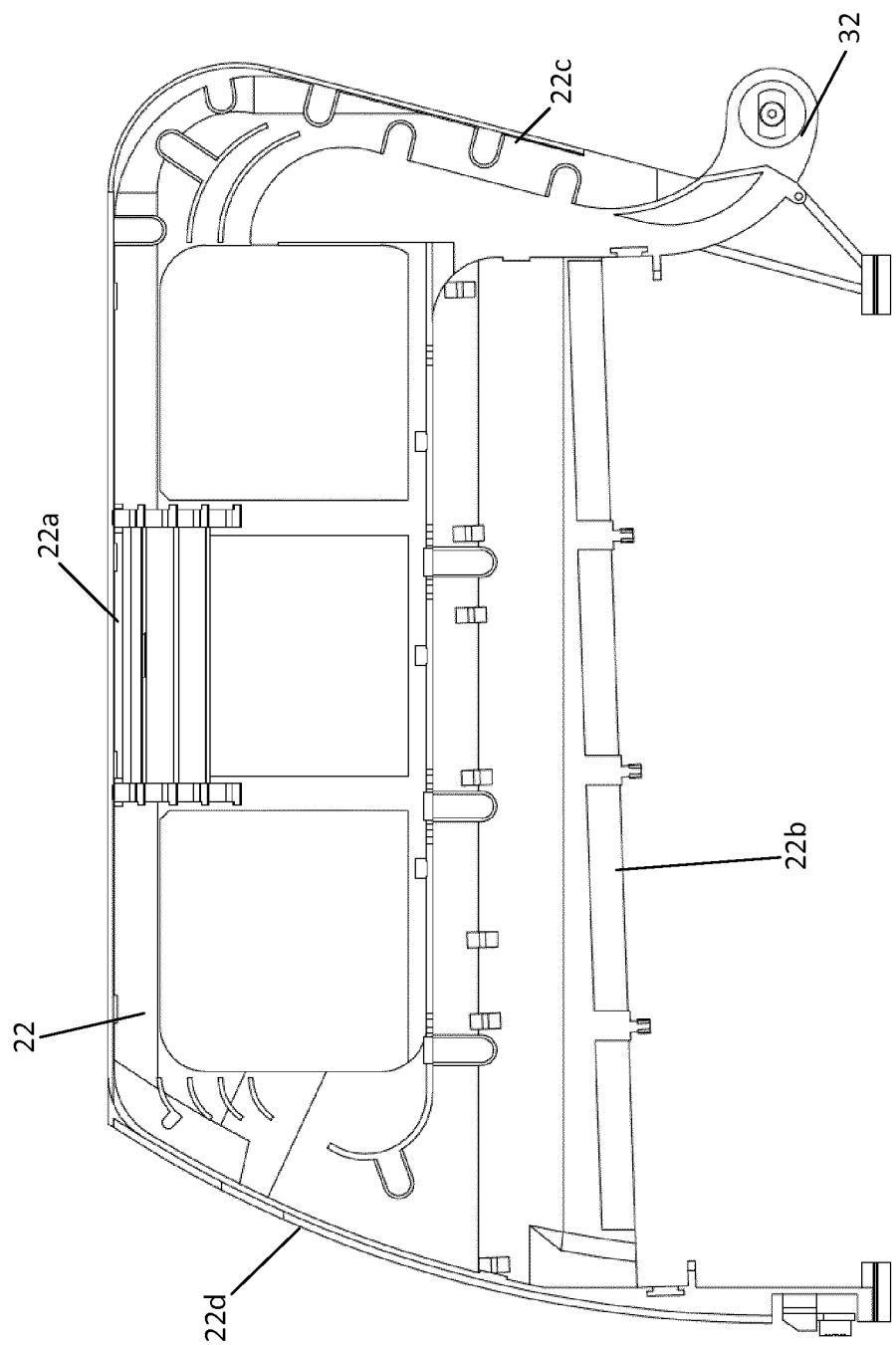
FIG. 10 is a top view of the tray of FIG. 9.
Figure 11:
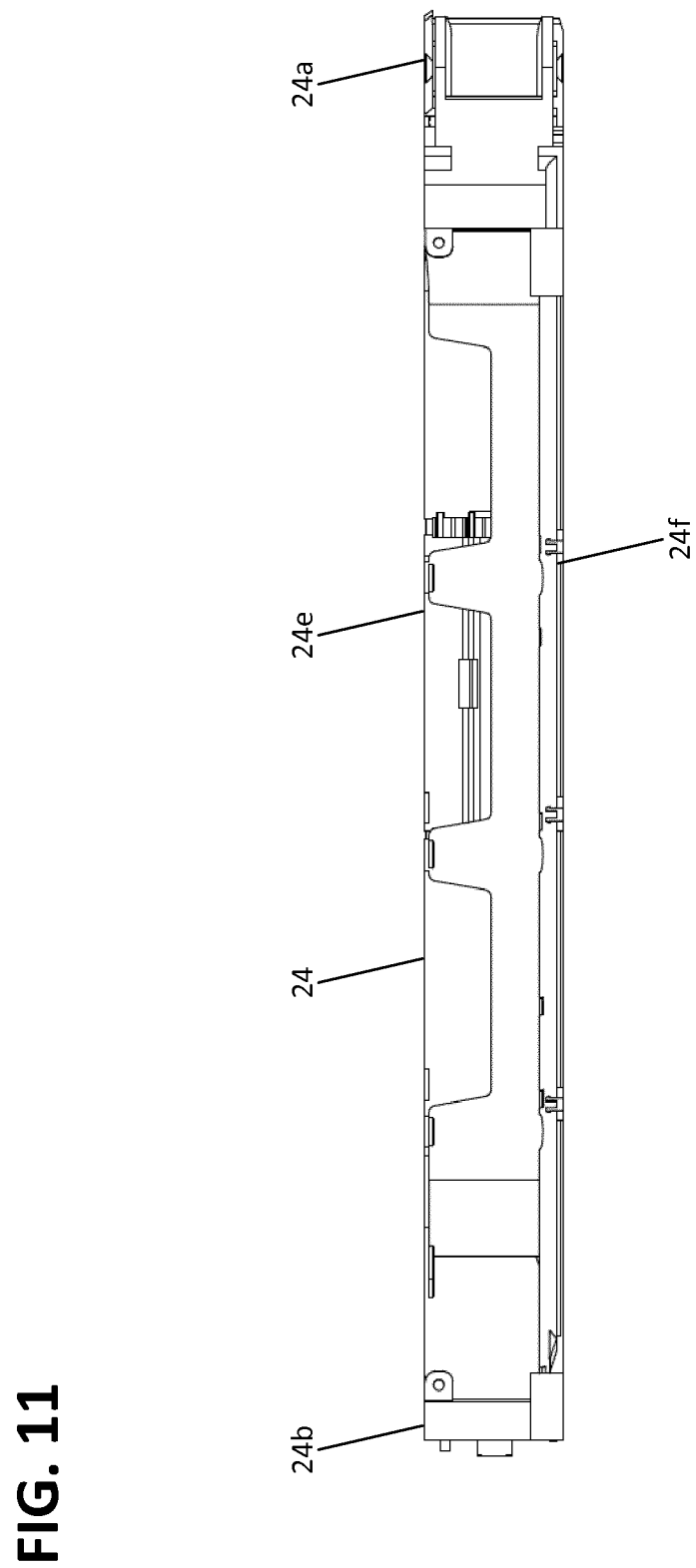
FIG. 11 is a front view of the tray of FIG. 10'.
Figure 12:
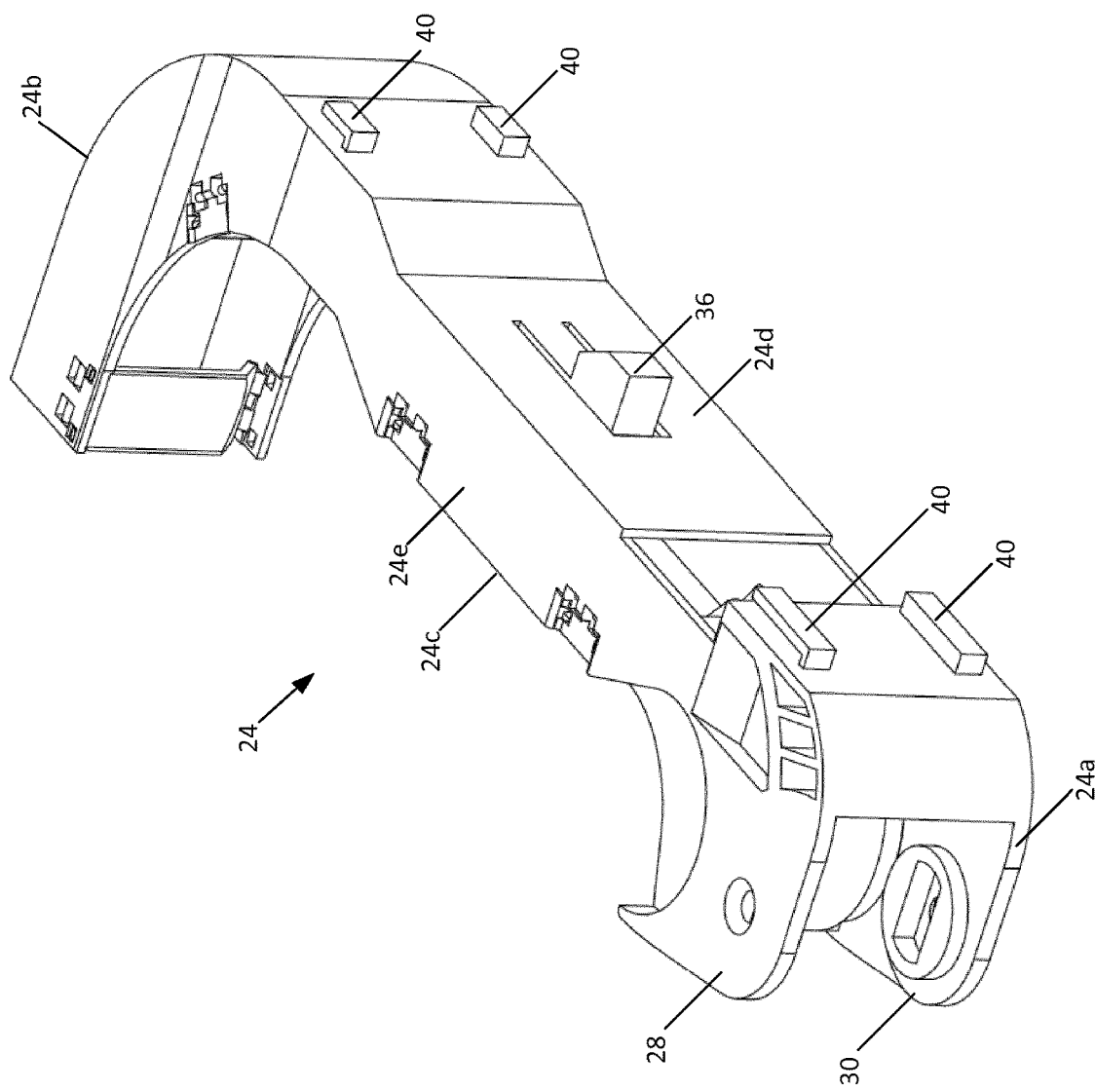
FIG. 12 is a front-right perspective view of a support arm of one of the multi-positionable trays of FIG. 1.
Figure 13:
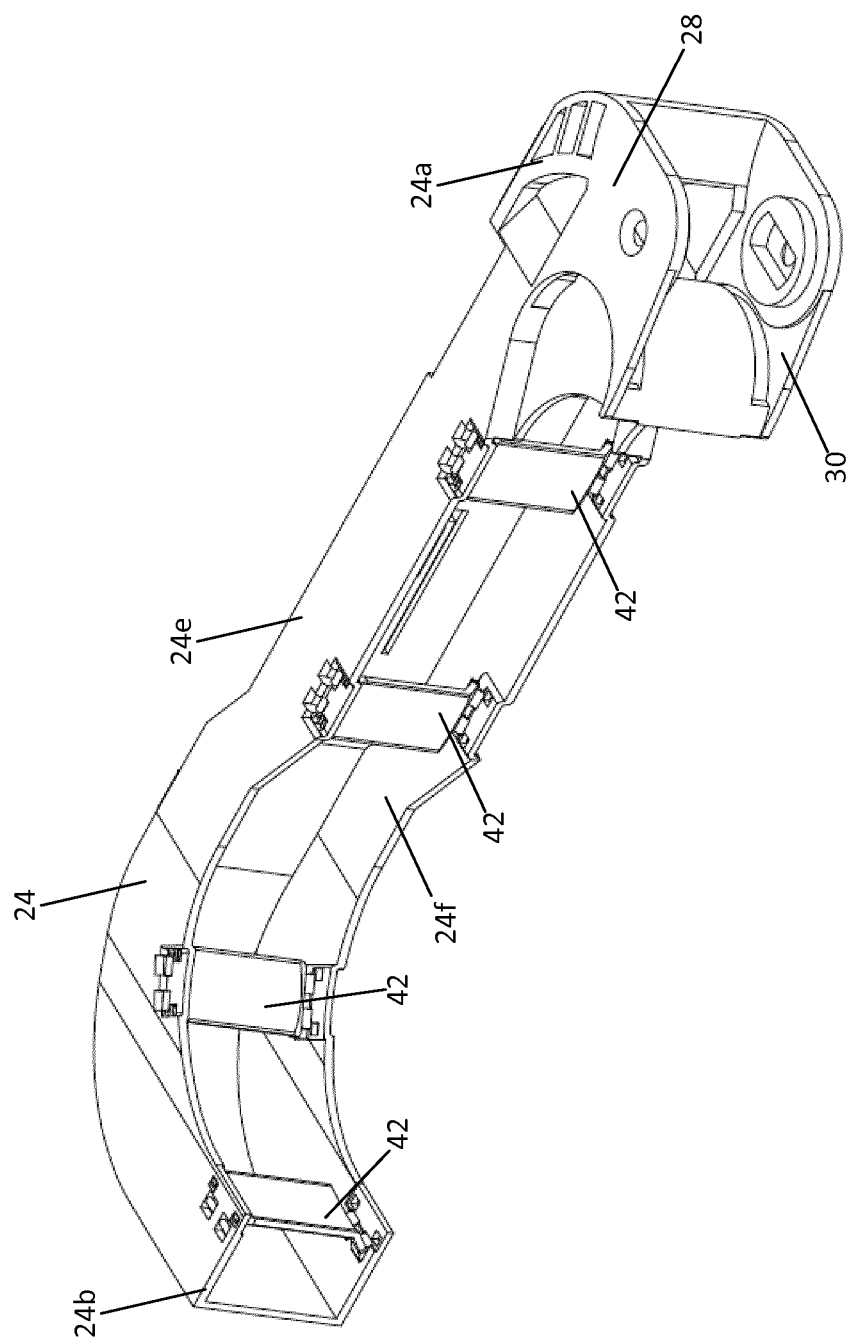
FIG. 13 is a front-left perspective view of the support arm of FIG. 12.
Figure 15:
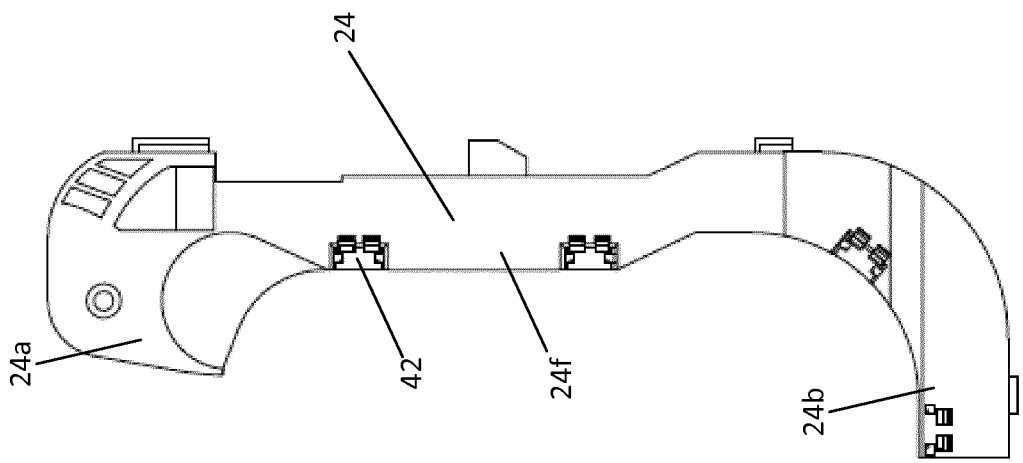
FIG. 15 is a bottom view of the support arm of FIG. 12.
Figure 14:
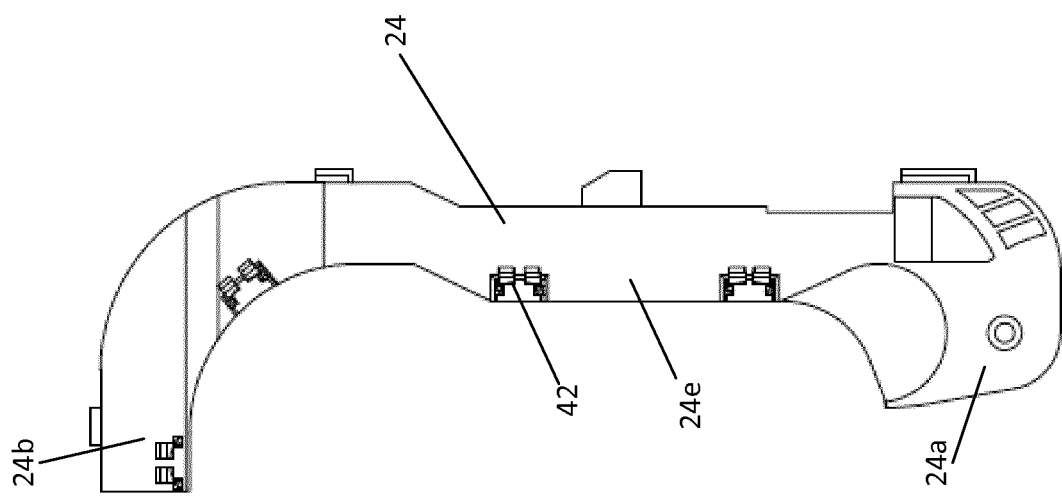
FIG. 14 is a top view of the support arm of FIG. 12.
Figure 16:
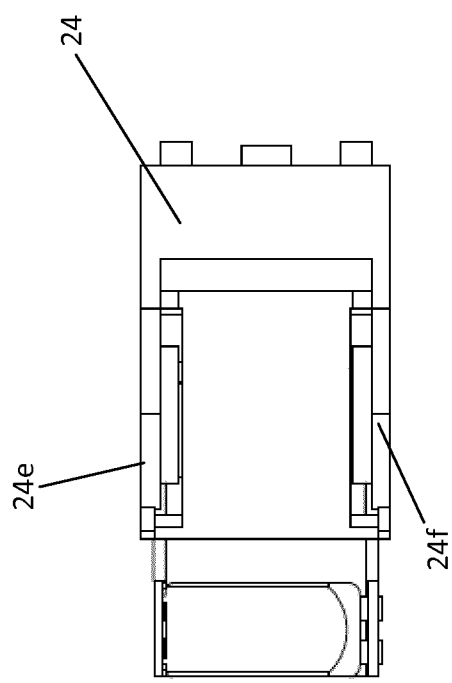
FIG. 16 is an end view of the support arm of FIG. 12.

Referring to FIG. 8, it can be seen that above described configuration results in the cable routing pathway 208 extending from the second end 24b of the support arm 24 to the first end 24a of the support arm 24, across the pivot joint 26, and along the first side 22c and rear side 22a of the tray 22. The cables 300 can further extend from the second end 24b of the support arm along the rear side 10a of the chassis 10 towards the second end 10d, and through the cable routing aperture 48.

In the embodiment presented, the tray 22 is configured to hold a plurality of splice trays 112 or other components to which the cables 300 can be routed along the rear side 22a of the tray 22. In the embodiment shown, the cables 300 extend to the splice trays 112 from which patch cables 302 extend as cabled ends 110a of fiber optic connectors 110. The fiber optic connectors 110 are shown as being connected to the first sides 108a of adapters 108. As shown, the adapters 108 are arranged along a transverse axis A2 which generally extends between the sides 22c and 22d of the tray 22. In one embodiment, the adapters 108 in the patch panel 104 are supported by a patch panel frame 106 extending along transverse axis A2 from a first end 106a proximate first side 22c to a second end 106b proximate second side 22d. Fiber optic connectors 114 are shown as being connected to the second sides 108b of the adapters 108. The fiber optic connectors 114 are shown as having cabled ends 114a which form patch cables 304 which can be routed through cable management features 44 and 50 to the outside of the telecommunications panel 100. As shown, cable management feature 50 is a patch cable holder rigidly attached to the patch panel frame 106.

As shown, the adapters 108 and connectors 110, 114 are aligned along an axis A3 which is shown as forming an oblique angle with the transverse axis A2. This configuration is advantageous over configurations in which the axes A2 and A3 are generally orthogonal in that less overall depth (i.e. the distance between the rear side 22a and the front side 22b) is required of the tray 22 in order to accommodate the cable management structures. Additionally, by disposing the cabled ends 114a of the connectors 114 at an angle towards the end of the telecommunications panel 100 at which the patch cables 304 exit via cable management feature 44, less turning is required of the cords and thus bend radius protection is enhanced. Likewise, by disposing the cabled ends 110a of the connectors 110 at an angle towards the splice trays 112, less turning is required of the cords and thus bend radius protection is enhanced in this manner as well. Space allocation can be further enhanced by arranging the patch panel frame 106 such that axis A3 is not parallel to the front plane A4 or rear side 22a. For example, the patch panel 104 and frame 106 can be oriented such that axis A3 is at an angle from about 2 to about 4 degrees, and preferably about 2.5 degrees, with respect to the axis A4 and the rear side 22a of the panel 22. This configuration allows for there to be a greater distance D1 provided between the patch panel 104 and the front face plane A4 of the tray 22 at the first side 22c, as compared to the corresponding distance D2 at the second side 22d of the tray 22. Likewise, this configuration also allows for there to be a greater distance D3 provided between the patch panel 104 and the splice tray 112 of the tray 22 at the second side 22d, as compared to the corresponding distance D4 at the first side 22c of the tray 22. As the patch cables 302 are greater towards the second end 22d of the tray 22 and the patch cables 304 are greater in number towards the first end 22c of the tray 22, the increased distances D1 and D3, respectively, provide for additional cable routing space where it is most needed and allows for a more compact construction of the tray 22.

It is noted that the drawings show a configuration in which the support arm 24 and pivot joint 26 are proximate the first side 22c of the tray 22. This configuration results in the tray 22 being pivotable from the first side 22c of the tray 22. However, the support arm 24 and tray 22 can be produced as mirror images of the embodiment shown in the drawings, such that the support arm 24 and pivot joint 26 are located proximate the second side 22d of the tray 22 which would allow for the tray 22 to be rotated about the second side 22d of the tray 22.

Figure 20:
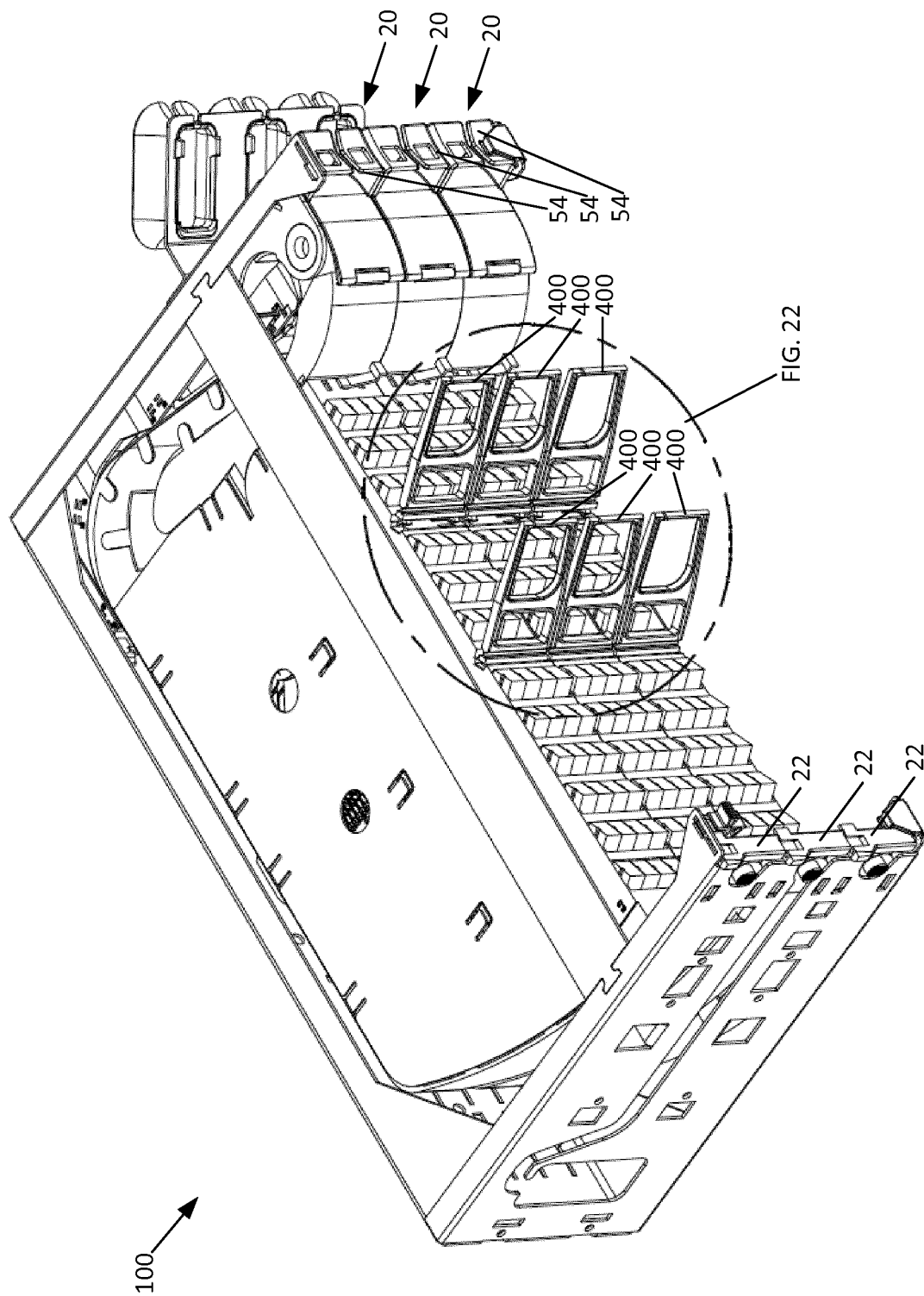
FIG. 20 is a perspective view of one of the multi-positionable tray assemblies of FIG. 1 with alternative patch cable holders installed.
Figure 21:
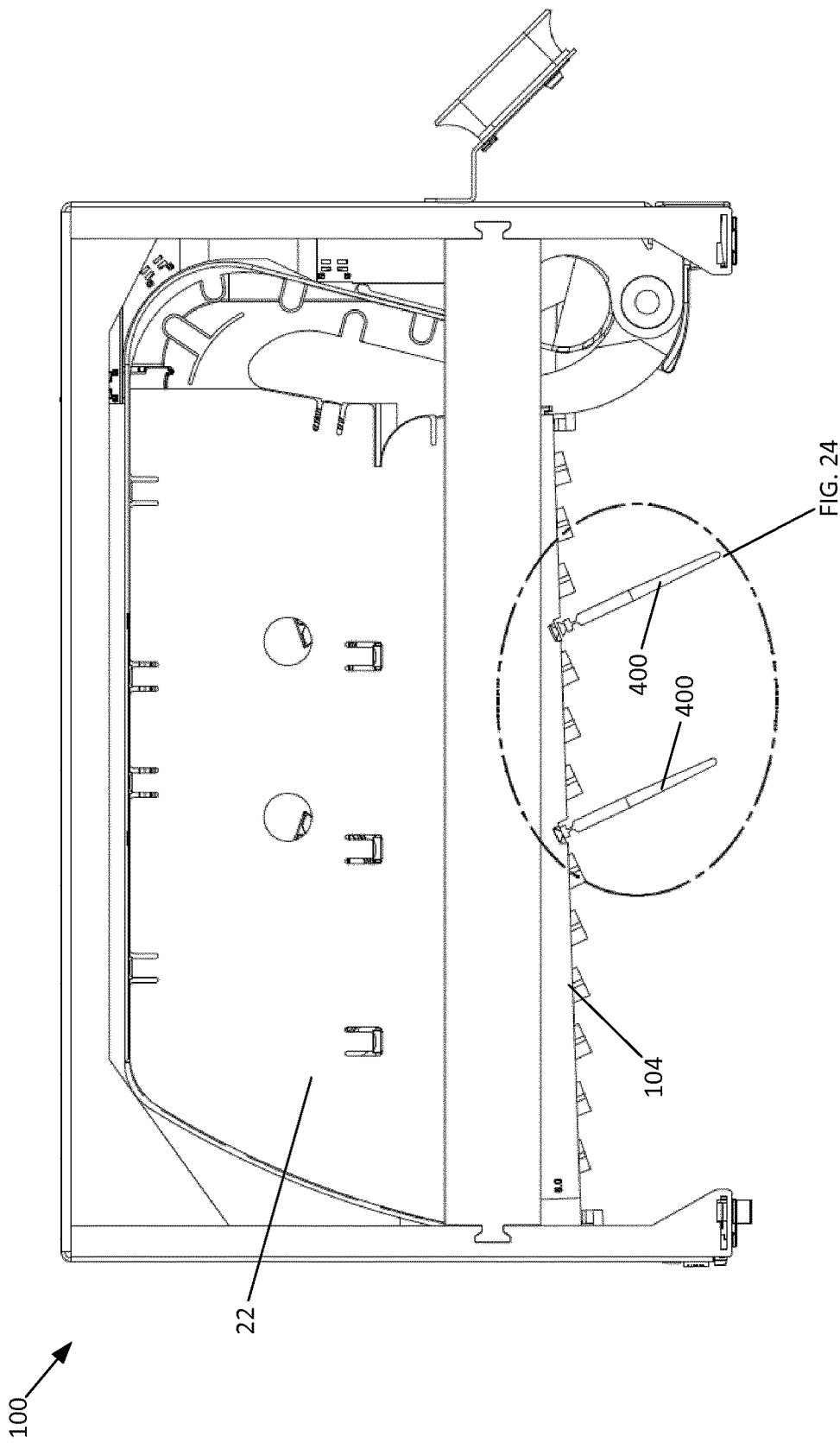
FIG. 21 is a top view of the multi-positionable tray assembly of FIG. 20.
Figure 22:
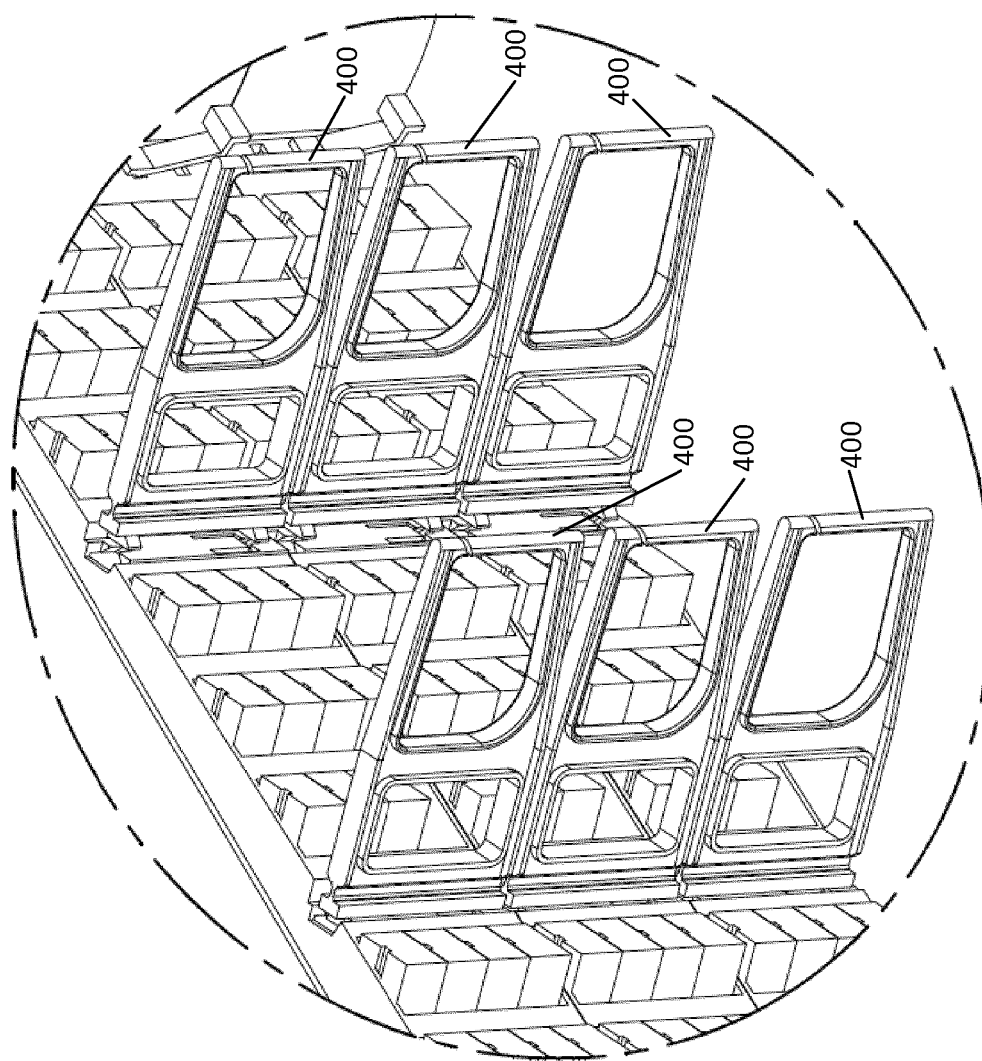
FIG. 22 is a perspective close up view of a portion of the multi-positionable tray assembly of FIG. 20 showing multiple attached and unattached patch cable holders.
Figure 23:
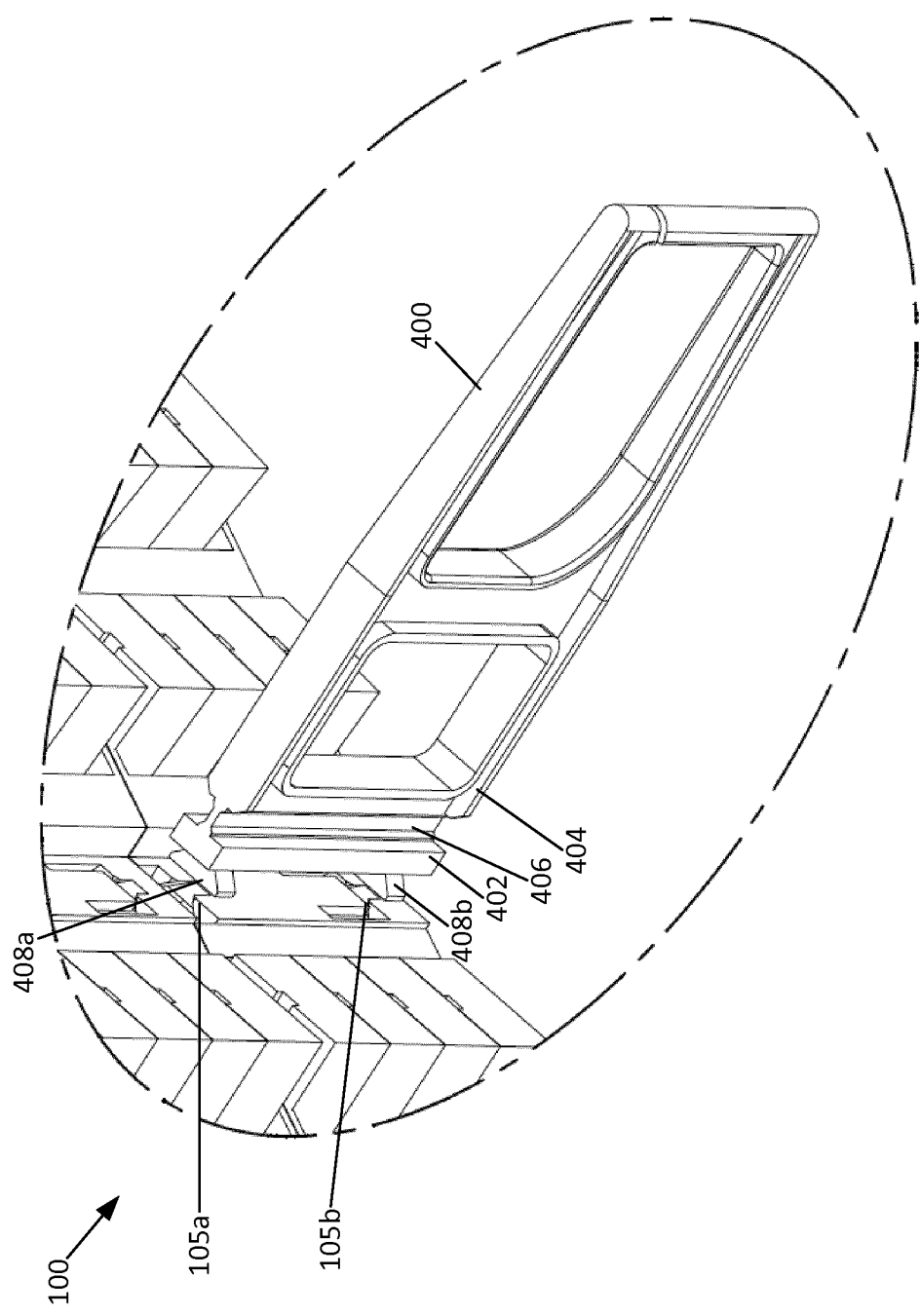
FIG. 23 is a perspective close up view of a portion of the multi-positionable tray assembly of FIG. 20 showing a single unattached patch cable holder.
Figure 24:
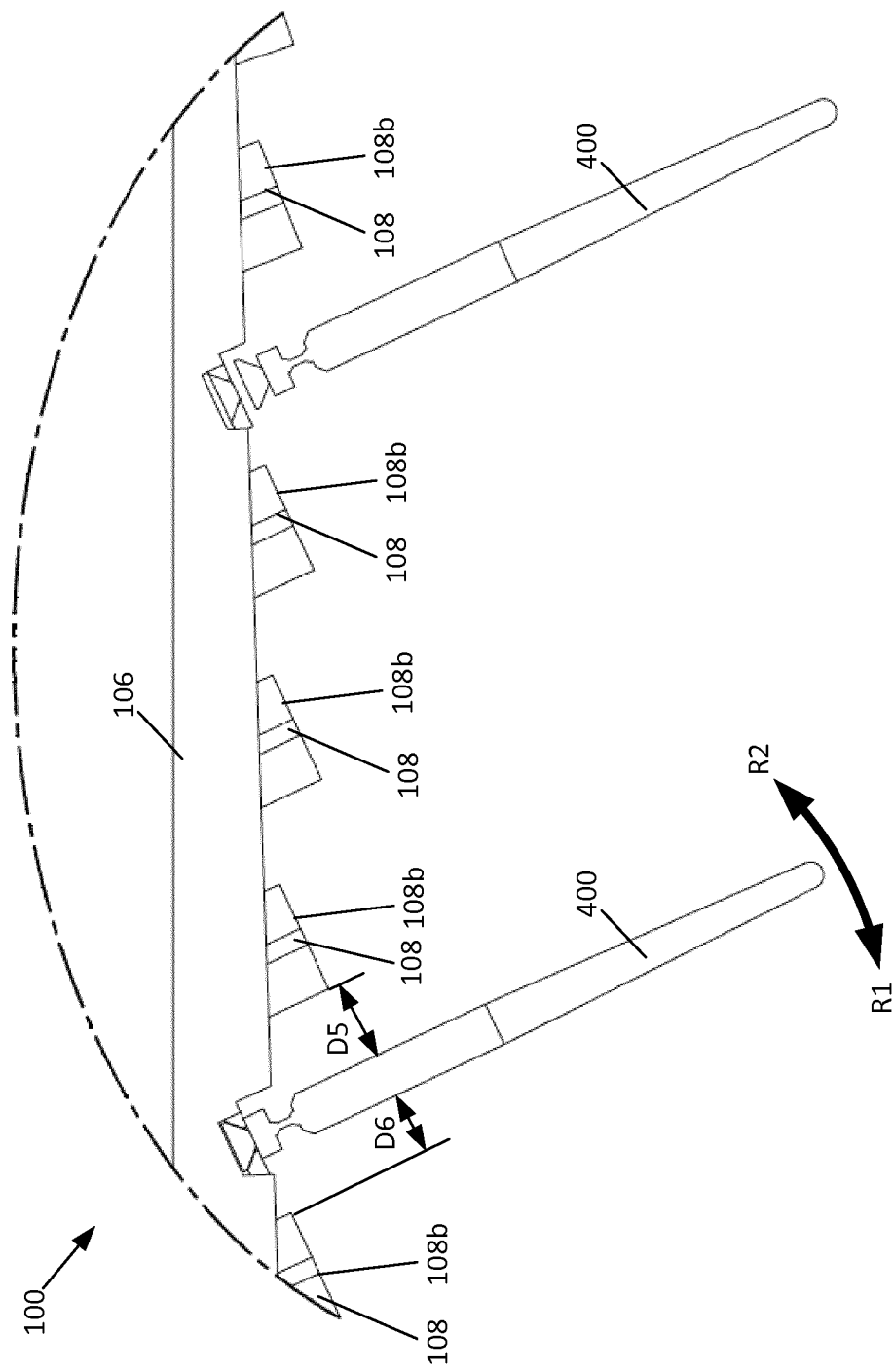
FIG. 24 is top close up view of a portion of the multi-positionable tray assembly of FIG. 20 showing multiple attached and unattached patch cable holders.

Referring to FIGS. 20-26 an embodiment of the telecommunications panel 100 is shown which utilizes an alternative patch cable holder 400 rather than the previously shown patch cable holder 50. It is noted that the embodiments shown in FIGS. 1-19 may be provided with patch cable holder 400 without departing from the concepts presented herein. As shown in FIGS. 20-22, three stacked tray assemblies 20 are provided in which each tray assembly 20 is provided with two patch cable holders 400 for a total of six patch cable holders 400 in the panel 100. When the tray assemblies 20 are in the folded position, the patch cable holders 400 are vertically aligned into two columns of three patch cable holders 400. It is noted that each tray assembly may be provided with only one patch cable holder 400 or more than two patch cable holder 400, such as three, four or five patch cable holders 400.

In one aspect, patch cable holder 400 is configured to be rotatable with respect to the patch panel 104 to increase the amount of space between the patch cable holder 400 and an adjacent connector 114 connected to an adapter 108. This configuration allows for easier manual access to the adjacent adapters 108 and connectors 114 and also allows the connectors 114 to be installed and removed with a person's fingers without the use of tooling. As most easily seen at FIG. 25, the patch cable holder 400 can be rotated in a first direction R1 away from an adjacent adapter 108 and/or connector 114 to maximize the distance D5 between the patch cable holder 400 and the adjacent adapter 108 and/or connector 114. Similarly, the patch cable holder 400 can be rotated in a second direction R2 away from an adjacent adapter 108 and/or connector 114 to maximize the distance D6 between the patch cable holder 400 and the adjacent adapter 108 and/or connector 114. This configuration allows for all of the connectors 114 to be installed and removed from the front side of the patch panel 104 without requiring the tray 22 to be opened into the access position. Because the tray 22 can remain in the closed or folded position, the disclosed configuration minimizes the risk of back side fiber movement and reduced optical performance that would be associated with having to open the tray 22 to install and/or remove connectors 114.

As shown, the patch cable holder 400 is provided with a base portion 402, a cable support portion 404, and a hinge portion 406 rotatably connecting the base portion 402 to the cable support portion 404. This configuration allows the cable support portion 404 to rotate generally about an axis A5 in the first and second directions R1, R2 with respect to the base portion. Where axis A5 is generally vertical, the first and second directions R1, R2 are in a generally horizontal plane. In one aspect, the base portion 402 is provided with a first side 402a that engages with the patch panel 104 and a second opposite side that interfaces with the hinge portion 406. To facilitate attachment to the patch panel 104, the first side 402a of the base portion 402 may be provided with one or attachment features 408. In the exemplary embodiment shown, the base portion 402 is provided with two attachment features 408 in an upper attachment feature 408a and a lower attachment feature 408b.

Figure 27:
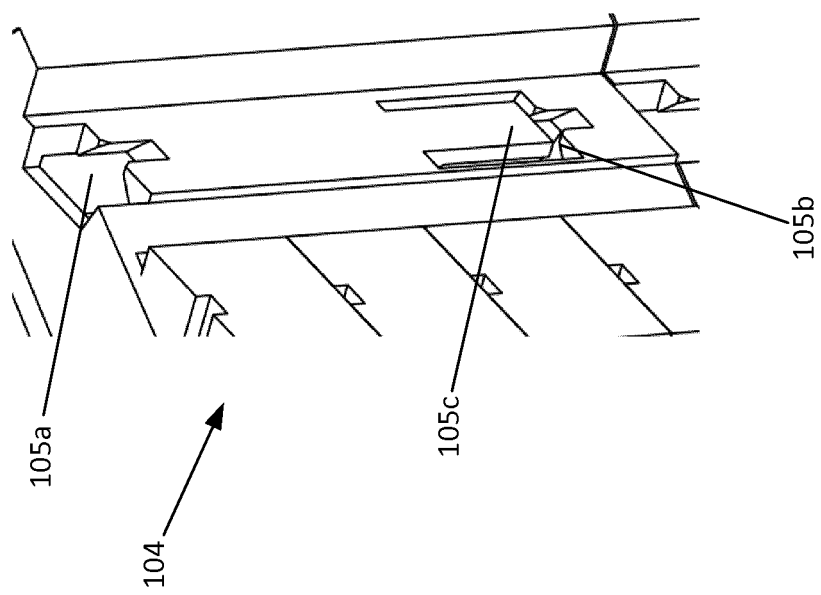
FIG. 27 is a partial perspective view of one of the multi-positionable tray assemblies of FIG. 1 without any patch cable holders installed.

As most easily seen at FIG. 27, the patch panel 104 can be provided with cooperating connecting features 105 for engaging with the attachment features 408 of the patch cable holder base portion 402. In the embodiment shown, the patch panel 104 is provided with two connecting features 105 with an upper connecting feature 105a configured to engage with the attachment feature 408a and a lower connecting feature 105b configured to engage with the attachment feature 408b. In one example, the attachment features 408 are configured as protrusions and the connecting features 105 are configured as recesses. However, the attachment features 408 can be configured as recesses with the connecting features 105 being configured as protrusions as well. Any other connecting structure that holds the base portion 402 in a non-rotatable state with respect to the patch panel may also be utilized, for example, channels, pins, latches, and fasteners. In the particular embodiment shown, the attachment features 408 and connecting features 105 are provided with a dovetail profile shape to form a dovetail joint between the patch panel 104 and the base portion 402.

As shown, the patch cable holder 400 is installed onto the patch panel 104 by orienting the patch cable holder 400 adjacent to the patch panel 104 such that the attachment features 408 are aligned with and above the connecting features 105, and then moving the patch cable holder 400 downwardly such that the attachment features 408 engage with the connecting features 105. To secure the patch cable holder 400 to the patch panel 104, the patch panel 105 may be provided with a retaining feature 105c. As shown, the retaining feature 105c is formed as a tab above the lower connecting feature 105b and is initially deflected inwards by the lower attachment feature 408b. Once the patch cable holder 400 is moved downwardly, such that the lower attachment feature 408b is engaged with the lower connecting feature 105b, the retaining feature 105c snaps over the top of the lower attachment feature 408b to lock the patch cable holder 400 to the patch panel 104. Once installed, the first side 402a of the base portion 402 is adjacent the retaining feature 105c such that the retaining feature 105c cannot be accessed from the front side of the patch panel 105, thereby preventing removal of the patch cable holder 400. However, the securing feature 105c and/or the patch cable holder 400 can be configured to allow access for unlocking the securing feature 105c from the front side and/or back side of the patch panel 104 for removal of a previously installed patch cable holder 400.

As described previously, a hinge portion 406 is provided to rotatably connect the base portion 402 to the cable support portion 404. In one example, the patch cable holder 400 is an integrally formed, one-piece component. In one example, the patch cable holder 400 is manufactured from a plastic or polymeric material. In such a configuration, the hinge portion 406 can be formed as an area of reduced material thickness to form a living hinge to allow the cable support portion 404 to rotate with respect to the base portion 402 about axis A5 or about an axis generally parallel to axis A5. However, other types of hinge interfaces are possible such that the base portion 402 and the cable support portion 404 are joined together at a hinge joint. For example, the base portion 402 and cable support portion 404 could be configured as separate parts with cooperating knuckles (i.e. loops, joints, nodes, curls, etc.) through which a pin extends to rotatably join the parts together to form a hinge assembly. Other configurations are possible. As shown, the hinge portion 406 runs continuously from a top portion 400a to a bottom portion 400b of the patch cable holder 400. However, the hinge portion 406 need not be formed continuously and may instead be formed by two or more intermittently spaced segments of material.

Figure 25:
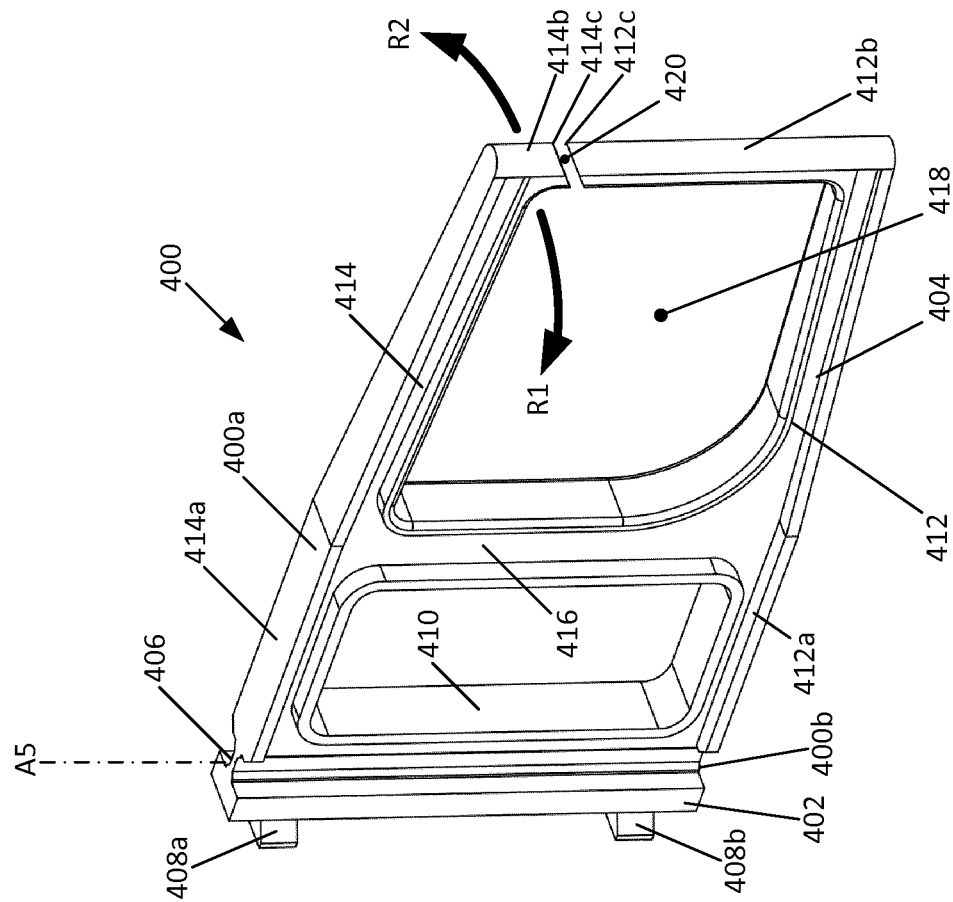
FIG. 25 is a front perspective view of a single patch cable holder of the multi-positionable tray of FIG. 20.
Figure 26:
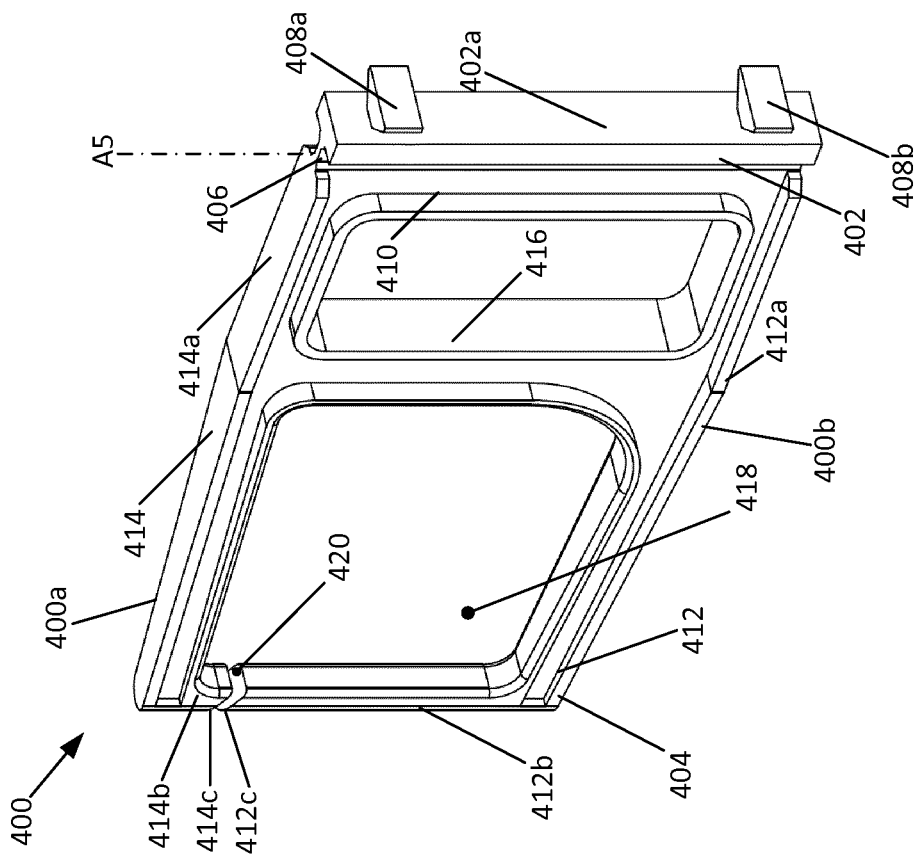
FIG. 26 is a rear perspective view of the single patch cable holder of FIG. 25.

As referenced in FIGS. 25-26, the cable support portion 404 of the patch cable holder 400 may be formed as a frame having a first vertical portion 410 extending along and adjacent to the hinge portion 406 from which a lower arm 412 and an upper arm 414 extend. To provide additional support, a second vertical portion 416 extending between the upper and lower arms 412, 414 may be provided. As shown, the lower arm 412 extends along the bottom portion 400b of the patch cable holder 400 and the upper arm 414 extends along the top portion 400a of the patch cable holder 400. The lower arm 412 functions to support the plurality of telecommunications patch cables 304 being held by the patch cable holder 400 while the upper arm 414 cooperatively functions with the lower arm 412 and the second vertical portion 416 to define an interior perimeter 418 within which the cables 304 are retained. Where the second vertical portion 416 is not used, the interior perimeter can be formed by the arms 412, 414 and the first vertical portion 410.

In the embodiment shown, the lower arm 412 includes a generally horizontal portion 412a extending from the first vertical portion 410 and an upwardly extending vertical portion 412b at the opposite end 412c. Similarly, the upper arm 414 includes a generally horizontal portion 414a extending from the first vertical portion 410 and a downwardly extending vertical portion 414b at the opposite end 414c.

In one example, the ends 412c, 414c of the respective upwardly extending portion 412b and the downwardly extending portion 414b can be aligned such that they are adjacent and facing each other, but spaced apart to form a gap or passageway 420 into the interior perimeter 418. In one aspect, the gap or passageway 20 is for allowing cables 304 to be installed and removed from the interior perimeter 418. The gap or passageway 420 can be provided with a dimension that is smaller than the diameter of the cables 304 for which the patch cable holder 400 is configured to support and retain to prevent cables 304 from migrating out of the interior perimeter 418 via the gap or passageway 420.

In one embodiment, the patch cable holder 400 is configured such that the upper to arm 414 is deflectable with respect to the lower arm 412 such that the size of the gap or passageway 420 can be momentarily increased to a dimension greater than the cables 304 by an operator such that the cables 304 can be installed and removed from the interior perimeter. This deflection can be achieved, for example, by rotating the upper arm 414 in the second direction R2 about an axis parallel to axis A5 and by either by holding the lower arm 412 stationary or by rotating the lower arm 412 in the first direction R1, or vice versa. Other configurations are also possible. For example, the end 412c of the upwardly extending portion 412b of the lower arm 412 can be adapted to deflect outwardly away from vertical portions 410, 416 to increase the size of the gap or passageway 20.

While this invention has been particularly shown and described with references to preferred embodiments thereof, it will be understood by those skilled in the art that various changes in form and details may be made therein without departing from the scope of the invention encompassed by the appended claims. The drawings are not necessarily to scale, emphasis instead being placed upon illustrating the principles of the invention and other modifications within the scope. Any such modifications or variations that fall within the purview of this description are intended to be included therein as well. It is understood that the description herein is intended to be illustrative only and is not intended to be limitative.

LIST OF REFERENCE NUMERALS AND CORRESPONDING FEATURES

A1 pivot axis
A2 transverse axis
A3 longitudinal connection axis
A4 front face plane
A5 patch cable holder rotational axis
D1 first distance
D2 second distance
D3 third distance
D4 fourth distance
D5 fifth distance
D6 sixth distance
R1 first direction
R2 second direction
1 telecommunications cabinet
10 chassis
10a rear side
10b front side
10c first side
10d second side
12 attachment slots
14 first latch recess
16 second latch recess
20 multi-positionable tray assembly
22 tray
23 tray cover
22a rear side
22b front side
22c first side
22d second side
22e interior wall structure
22f radius guides
22g cable guides
23 tray cover
24 support arm
24a first end
24b second end
24c open interior side
24d exterior side
24e top wall
24f bottom wall
26 pivot joint
28 upper joint arm
30 lower joint arm
32 upper joint extension
34 lower joint extension
36 first latch member
38 second latch member
40 attachment guide members
42 support arm cable guides
44 cable management feature
46 cable routing slot
48 cable routing aperture
50 patch cable holder
52 cover hinges
54 cable management feature
100 telecommunications panel
102 cable management structure
104 patch panel
105 patch panel holder connecting feature
105a upper connecting feature
105b lower connecting feature
105c retaining feature
106 patch panel frame
106a first end
106b second end
108 fiber optic adapters
108a first side
108b second side
110 first fiber optic connectors
110a cabled end
112 splice tray
114 second fiber optic connectors
114a cabled end
200 folded position
202 access position
204 installed position 206 removed position
208 cable routing pathway
300 cables
302 patch cable
304 patch cable
400 patch cable holder
400a top portion
400b bottom portion
402 base portion
402a first side
402b second side
404 cable support portion
406 hinge portion
408 attachment feature
410 first vertical portion
412 lower arm
412a horizontal portion
412b upwardly extending portion
412c first end
414 upper arm
414a horizontal portion
414b downwardly extending portion
414c first end
416 second vertical portion
418 interior perimeter
420 gap

What is claimed is:

1. A patch cable holder comprising:
   a) a single-component main body defining:
      i) a base structure oriented in a vertical direction;
      ii) an attachment feature for forming a snap-fit type connection with a telecommunications component, the attachment feature being supported by the base structure including a pair of vertically aligned projection members extending from the base structure, wherein the base structure abuts the telecommunications component when the attachment feature is engaged with the telecommunications component; and
      iii) a cable support portion supported by the base structure on a side opposite the attachment feature, the cable support portion defining a first vertical portion and a first horizontal portion for supporting a plurality of patch cables, wherein the first horizontal portion is deflectable relative to the base structure about an axis parallel to the base structure, and wherein the first vertical portion is deflectable relative to the first horizontal portion.

2. The patch cable holder of claim 1, wherein the pair of projections are provided with a dovetail shape.

3. The patch cable holder of claim 1, wherein the cable support portion is rotatable with respect to the base structure.

4. The patch cable holder of claim 1, wherein the first horizontal portion and the first vertical portion are defined by a lower support arm.

5. The patch cable holder of claim 4, further comprising an upper support arm defining a second horizontal portion.

6. The patch cable holder of claim 5, wherein the upper support arm is deflectable with respect to the lower support arm.

7. The patch cable holder of claim 1, wherein at least one of the projection members has a dimension proximate the base structure that is smaller than a corresponding dimension remote from the base structure.

8. A tray assembly for mounting within a chassis of a telecommunications panel, the tray assembly comprising:
   a) a tray configured to support at least one cable management structure; and
   b) a patch panel defining a front portion of the tray, the patch panel including an array of fiber optic adapters; and
   c) a plurality of patch cable holders mounted to the patch panel by an attachment feature provided on the patch cable holders, wherein the plurality of patch cable holders are disposed at an oblique angle to the front portion of the tray, wherein the patch panel, for each of the plurality of patch cable holders, includes an upper connecting feature and a lower connecting feature for connecting with the attachment feature of the patch cable holder.

9. The tray assembly of claim 8, wherein the patch panel is provided with a slot structure for connecting with the attachment feature of the plurality of patch cable holders.

10. The tray assembly of claim 8, wherein at least one of the upper and lower connecting features is configured as a slot.

11. The tray assembly of claim 8, wherein at least one of the upper and lower connecting features is provided with a retaining feature configured to snap over a projection member of the attachment feature of the plurality of patch cable holders.

12. The tray assembly of claim 11, wherein the lower connection feature is provided with the retaining feature.

13. The tray assembly of claim 8, wherein the upper and lower connecting features and the attachment feature are configured to form a dovetail joint.

14. The tray assembly of claim 13, wherein at least one of the upper and lower connecting features is provided with a retaining feature configured to snap over a projection member of the attachment feature of the plurality of patch cable holders.

15. The tray assembly of claim 14, wherein the lower connection feature is provided with the retaining feature.

16. A tray assembly for mounting within a chassis of a telecommunications panel, the tray assembly comprising:
   a) a tray configured to support at least one cable management structure;
   b) a patch panel defining a front portion of the tray, the patch panel including an array of fiber optic adapters and a plurality of connection features located between at least some of the fiber optic adapters; and
   c) a plurality of patch cable holders, each having a pair of projection members forming a snap-fit connection to one of the plurality of connection features of the patch panel, wherein the plurality of patch cable holders are disposed at an oblique angle to the front portion of the tray.

17. The tray assembly of claim 16, wherein the plurality of connection features each include an upper portion for receiving one of the pair of projection members of one of the patch cable holders and include a lower portion for receiving the other of the pair of projection members of the patch cable holder.

* * * * *

UNITED STATES PATENT AND TRADEMARK OFFICE
CERTIFICATE OF CORRECTION

| | |
|---|---|
| PATENT NO. | : 11,448,843 B2 |
| APPLICATION NO. | : 16/853243 |
| DATED | : September 20, 2022 |
| INVENTOR(S) | : Geling et al. |

It is certified that error appears in the above-identified patent and that said Letters Patent is hereby corrected as shown below:

In the Claims

Column 12, Line 6, Claim 8: "structure; and" should read --structure;--

Signed and Sealed this
Twenty-fifth Day of June, 2024

*Katherine Kelly Vidal*

Katherine Kelly Vidal
*Director of the United States Patent and Trademark Office*